US012675398B2

(12) United States Patent
Sumiyoshi et al.

(10) Patent No.: US 12,675,398 B2
(45) Date of Patent: Jul. 7, 2026

(54) DATA COMPRESSION DEVICE, DATA DECOMPRESSION DEVICE, AND MEMORY SYSTEM

(71) Applicant: Kioxia Corporation, Tokyo (JP)

(72) Inventors: Masato Sumiyoshi, Yokohama Kanagawa (JP); Sho Kodama, Kamakura Kanagawa (JP); Keiri Nakanishi, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 28 days.

(21) Appl. No.: 18/829,536

(22) Filed: Sep. 10, 2024

(65) Prior Publication Data

US 2025/0291714 A1 Sep. 18, 2025

(30) Foreign Application Priority Data

Mar. 13, 2024 (JP) ................................. 2024-039045

(51) Int. Cl.
*G06F 12/02* (2006.01)
(52) U.S. Cl.
CPC ................................. *G06F 12/0246* (2013.01)
(58) Field of Classification Search
CPC .. G06F 12/0246; G06F 16/1744; G06F 11/10; G06F 40/242

USPC .............. 711/103, 151, 154, 12.009, 12.074, 711/12.008
See application file for complete search history.

(56) References Cited

U.S. PATENT DOCUMENTS

| | | | | |
|---|---|---|---|---|
| 9,859,918 | B1 * | 1/2018 | Gopal ................... | G06F 13/409 |
| 2016/0085555 | A1 * | 3/2016 | Gopal ................. | H03M 7/3091 |
| | | | | 711/125 |
| 2018/0173642 | A1 * | 6/2018 | Vattakandy ......... | H03M 7/3086 |
| 2018/0253559 | A1 * | 9/2018 | Satpathy ............... | H04L 9/0631 |
| 2019/0044534 | A1 * | 2/2019 | Kumar ................ | H03M 7/3086 |

* cited by examiner

*Primary Examiner* — Jared I Rutz
*Assistant Examiner* — Edward Waddy, Jr.
(74) *Attorney, Agent, or Firm* — Maier & Maier, PLLC

(57) ABSTRACT

According to one embodiment, a data compression device includes all-literal determination circuitry and end-of-block symbol addition circuitry. In a case where dictionary-based compression on a first data block is performed, the all-literal determination circuitry determines whether all one or more symbols in a second data block are literal symbols. The symbols are obtained by performing the dictionary-based compression on the first data block. When all the symbols are literal symbols, end-of-block symbol addition circuitry does not add an end-of-block symbol to an end of the second data block. When at least one symbol among the symbols is not a literal symbol, the end-of-block symbol addition circuitry adds the end-of-block symbol to the end of the second data block.

11 Claims, 12 Drawing Sheets

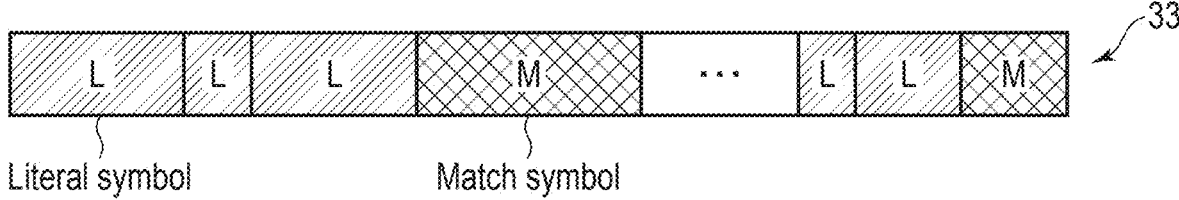
Literal symbol              Match symbol
F I G. 2

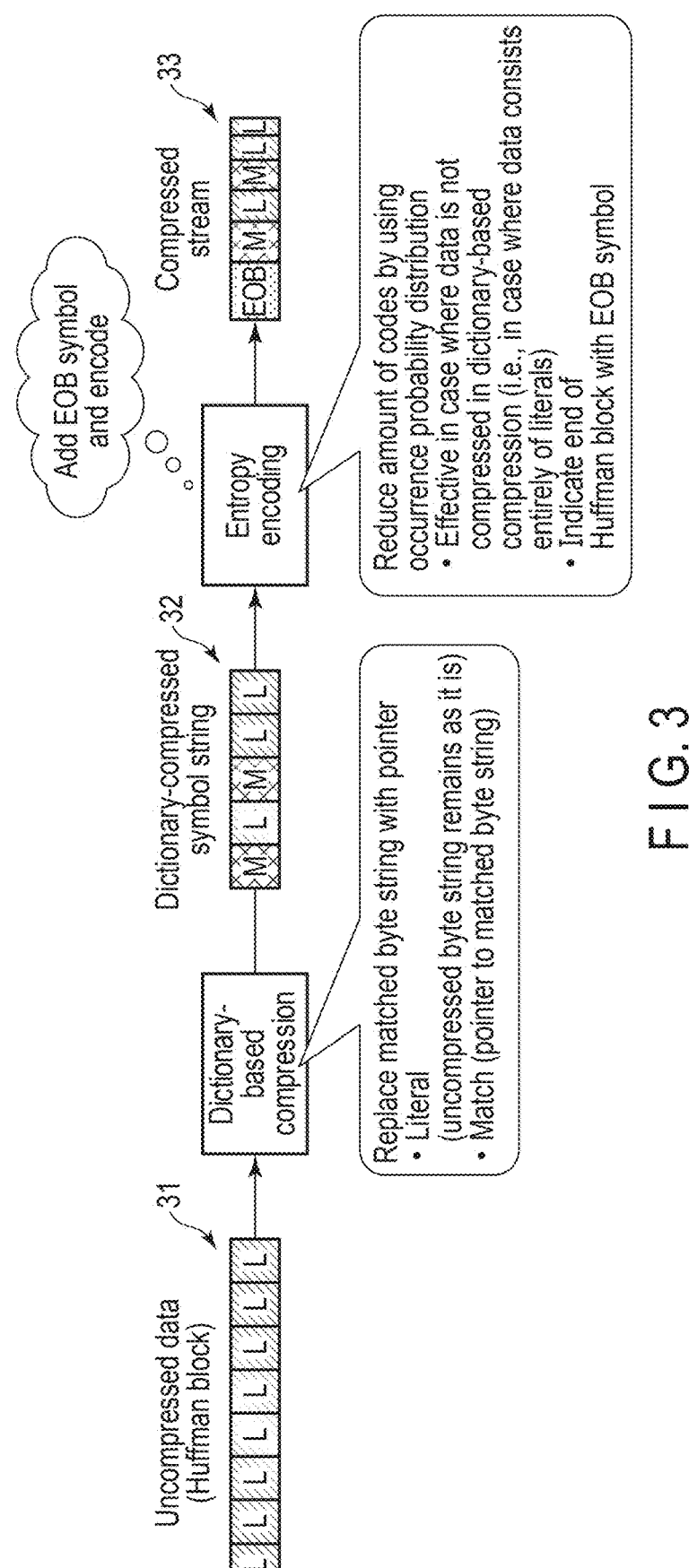
F I G. 3

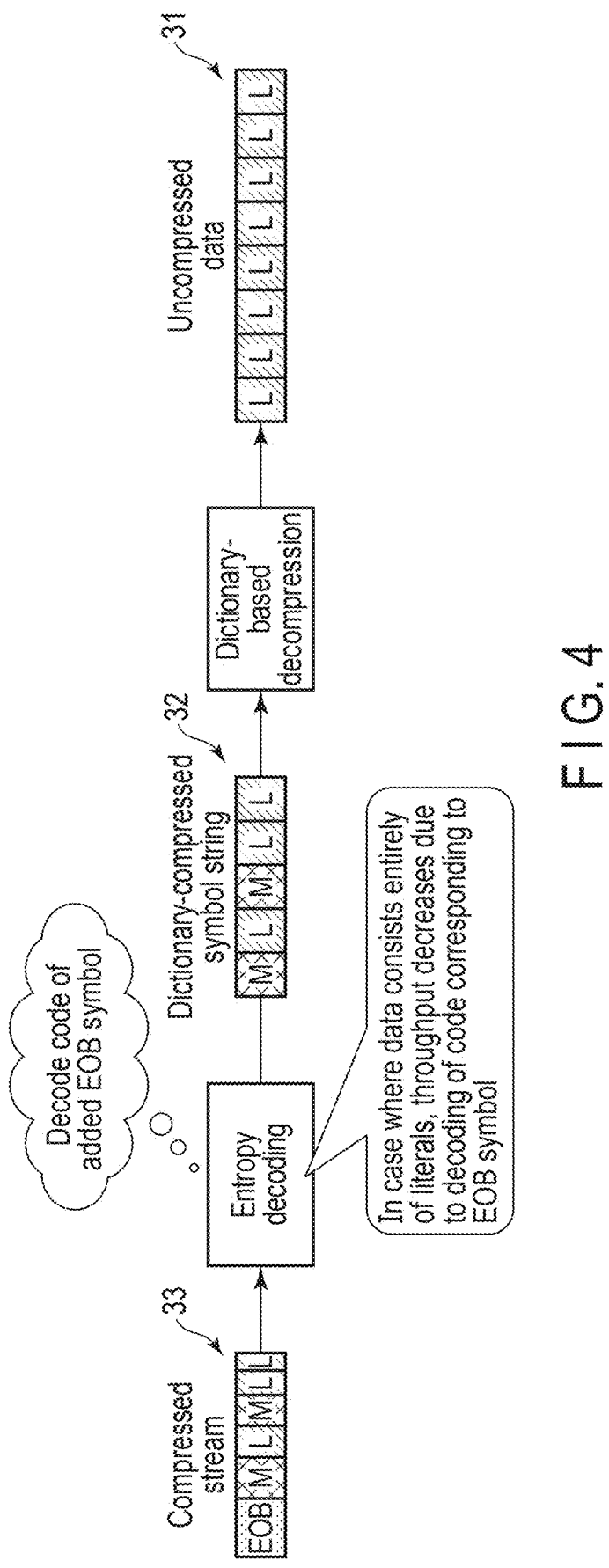
F I G. 4

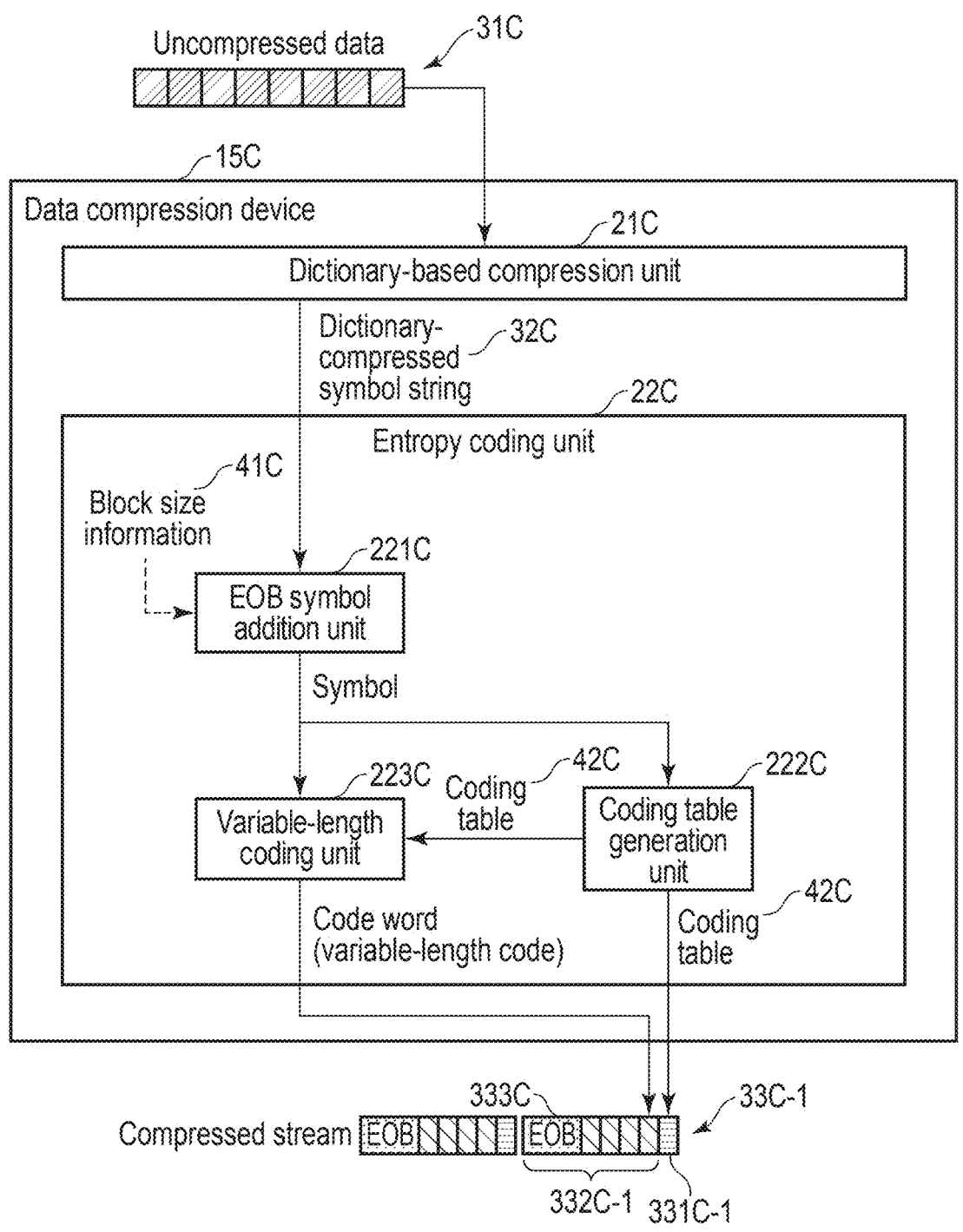
F I G. 5

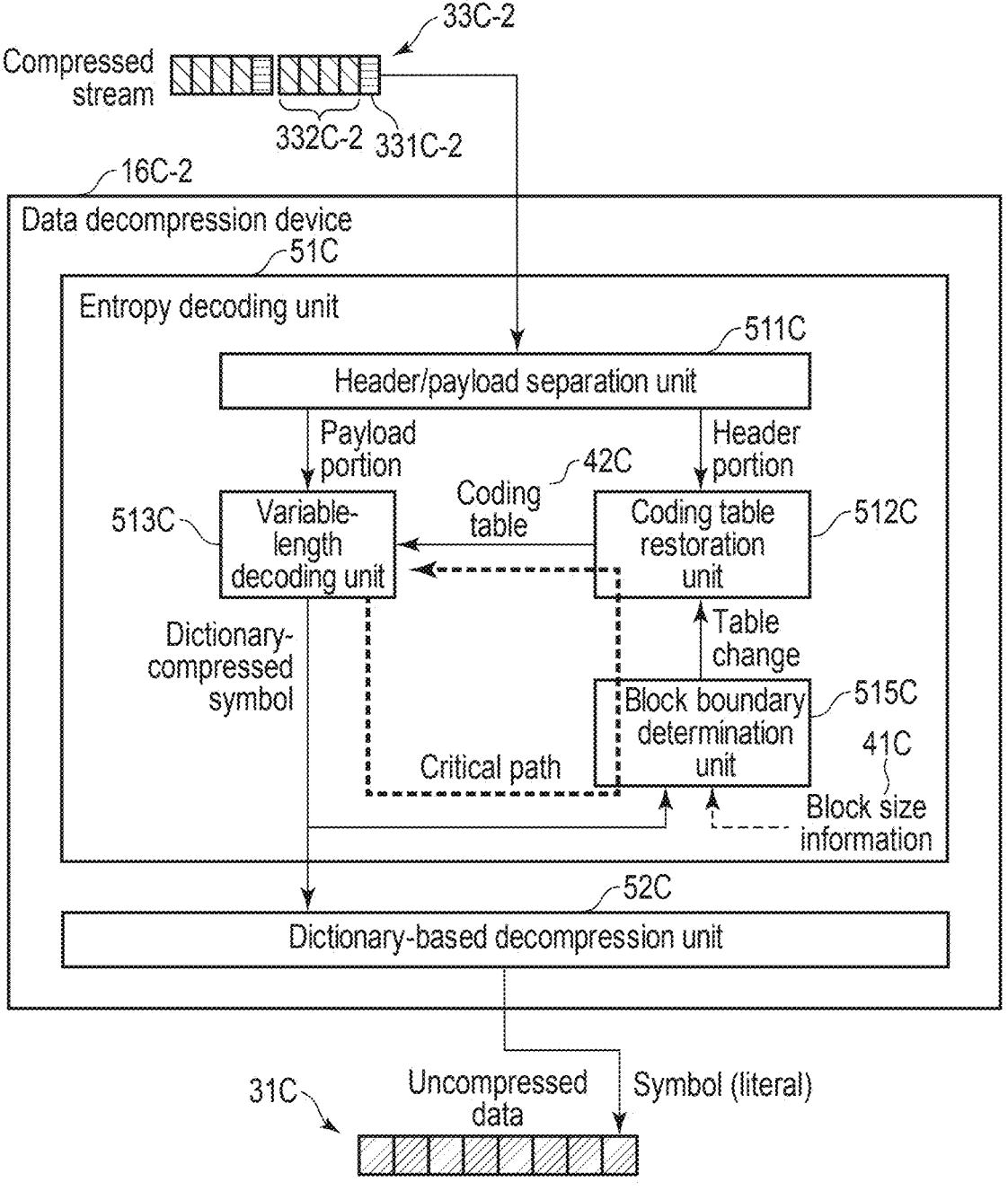
F I G. 7

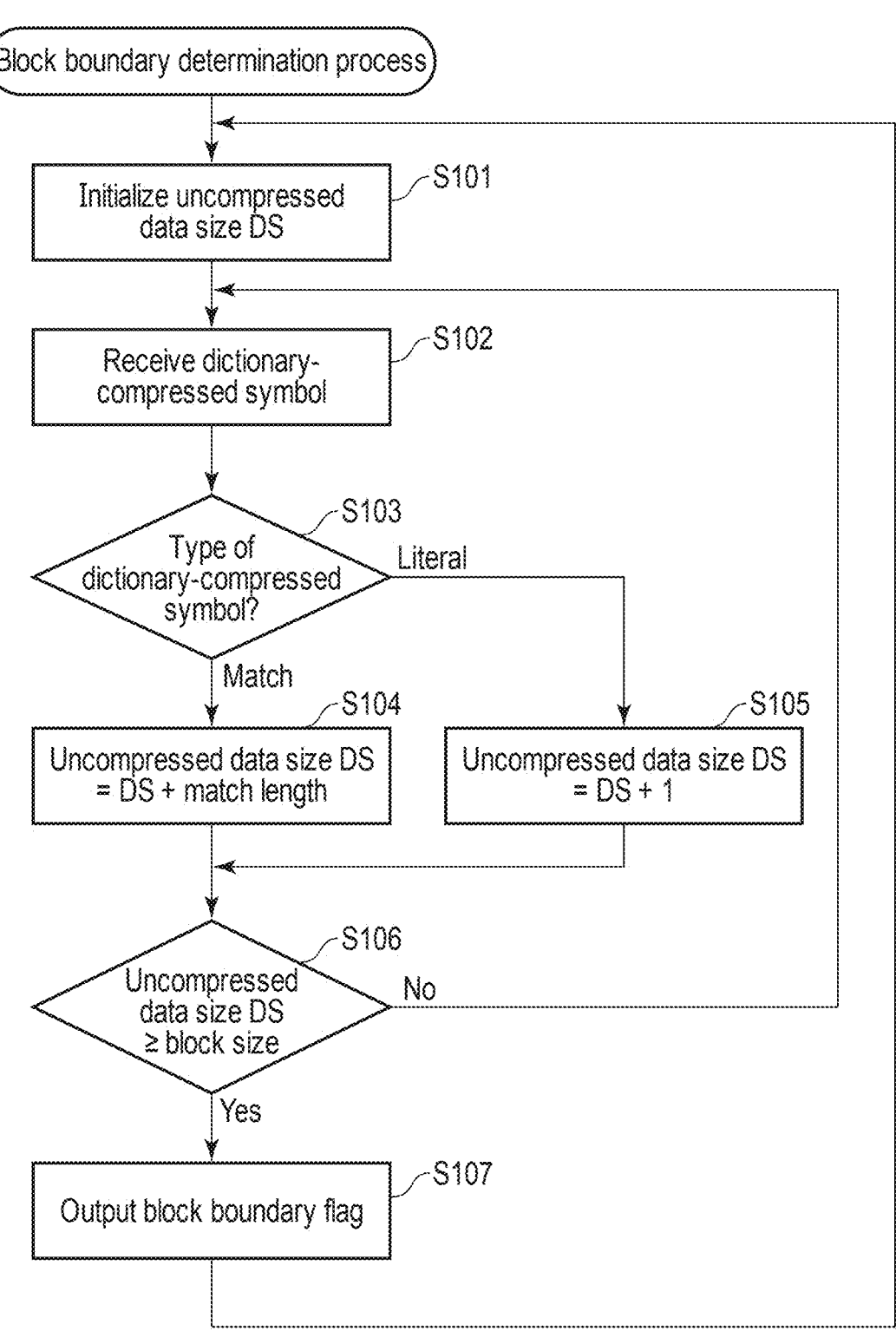
F I G. 8

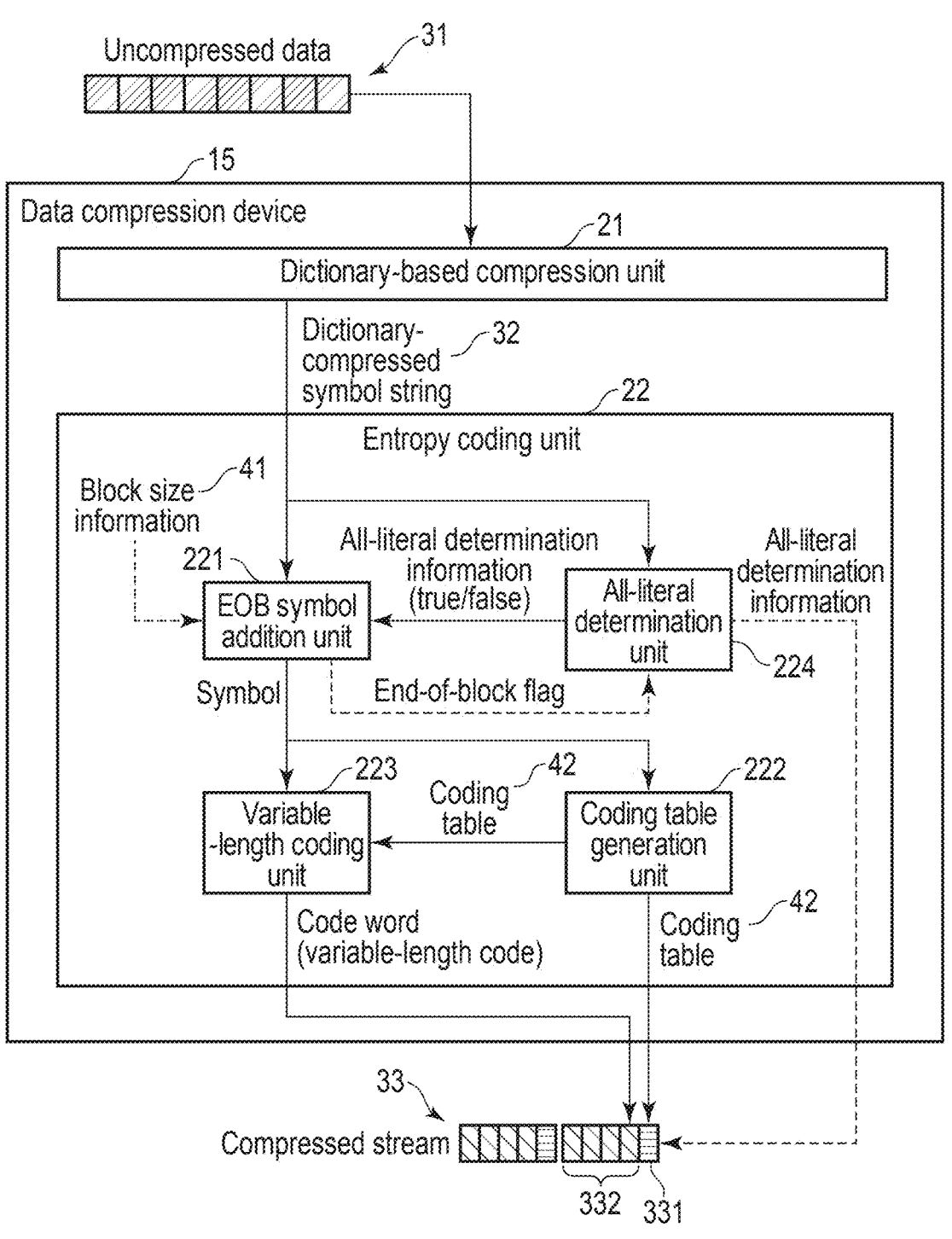
F I G. 9

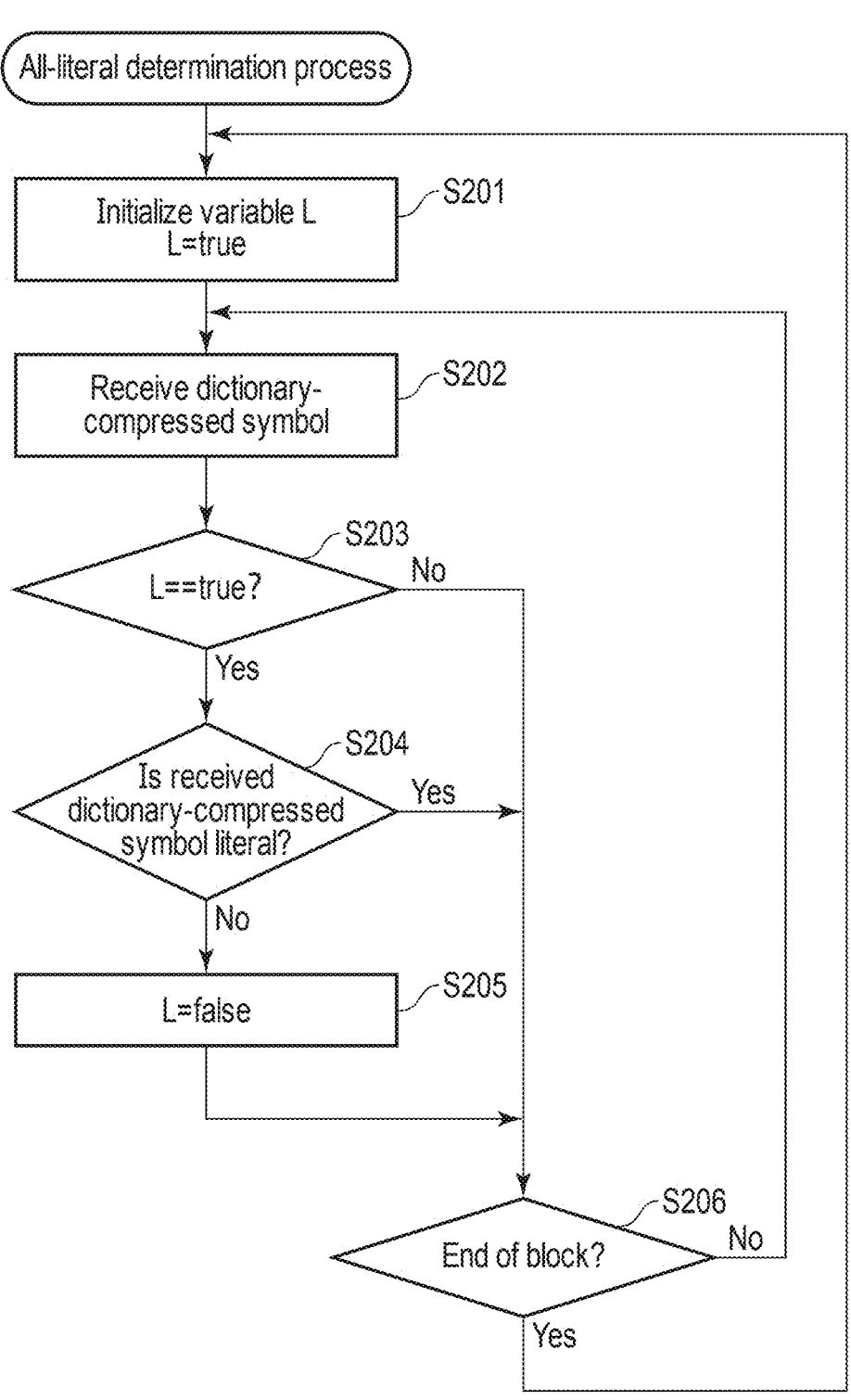
F I G. 10

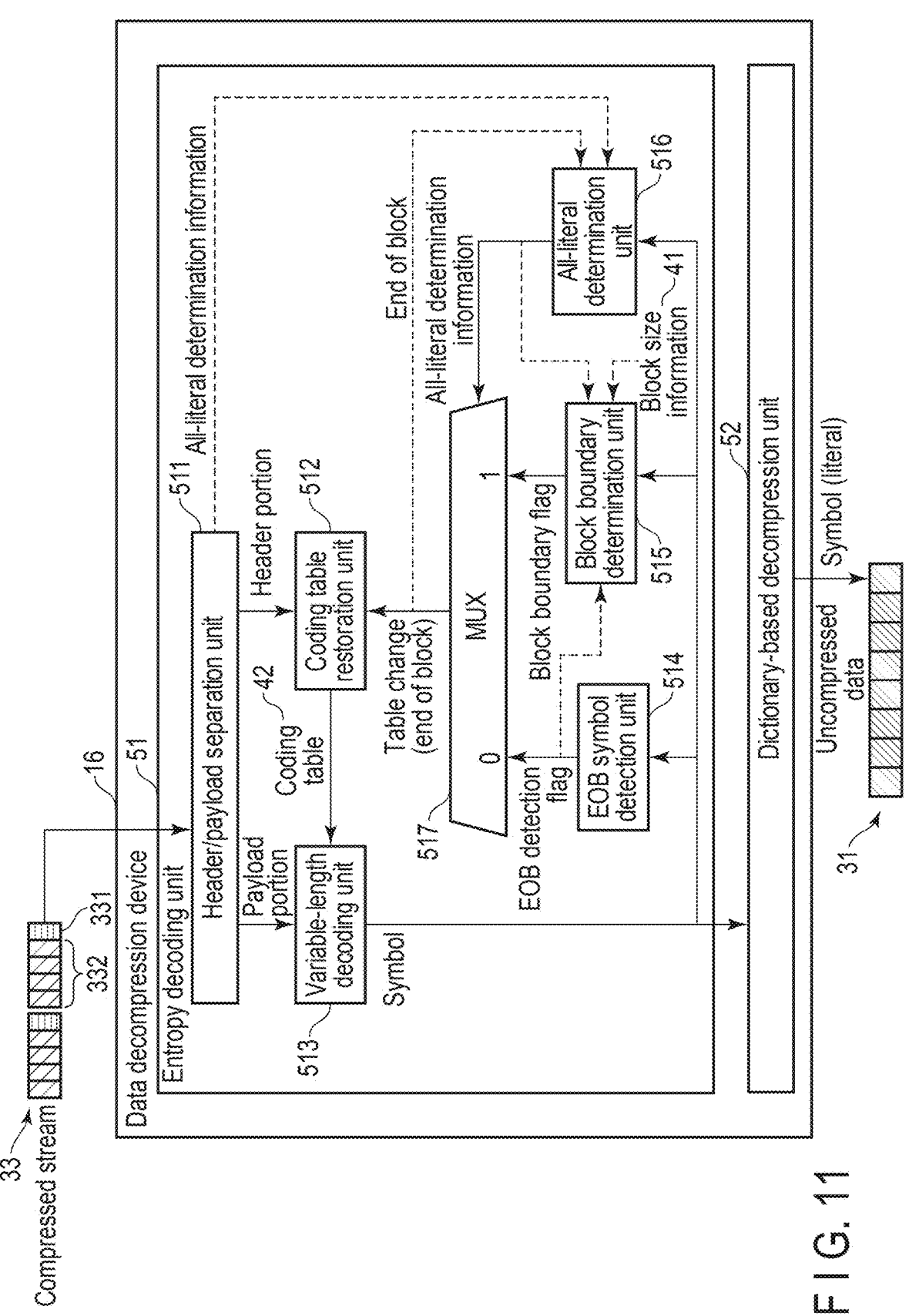
F I G. 11

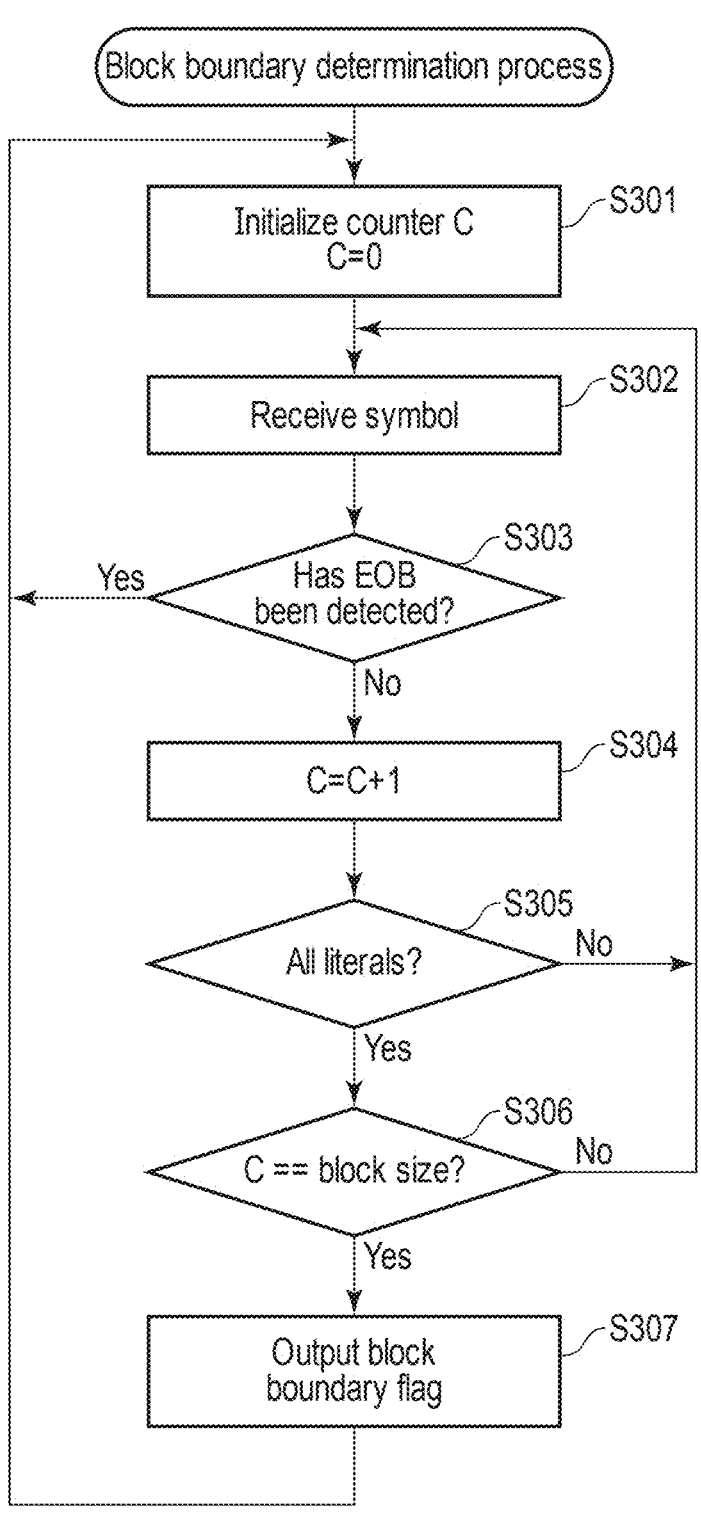
F I G. 12

DATA COMPRESSION DEVICE, DATA DECOMPRESSION DEVICE, AND MEMORY SYSTEM

CROSS-REFERENCE TO RELATED APPLICATIONS

This application is based upon and claims the benefit of priority from Japanese Patent Application No. 2024-039045, filed Mar. 13, 2024, the entire contents of which are incorporated herein by reference.

FIELD

Embodiments described herein relate generally to a technique of compressing or decompressing data.

BACKGROUND

As a compression method for compressing data to generate compressed data (a compressed stream), for example, DEFLATE defined in RFC1951 is known. DEFLATE defines entropy coding for a symbol string obtained as a result of dictionary-based compression.

The entropy coding is a variable-length coding scheme for generating a coding table based on frequencies of occurrence of symbols in a symbol string to be encoded for each symbol. The coding table indicates a correspondence between a symbol and a code word that is assigned to the symbol. In the entropy coding, a short code word is assigned to a symbol that occurs at a high frequency, and a long code word is assigned to a symbol that occurs at a low frequency. Therefore, each of the symbols to be encoded is converted into a variable-length code by using the coding table.

BRIEF DESCRIPTION OF THE DRAWINGS

FIG. 2 is a diagram illustrating an example of a compressed stream output from the data compression device or input to the data decompression device according to the embodiment.

FIG. 3 is a diagram illustrating an example of data generated in dictionary-based compression and entropy coding performed by the data compression device according to the embodiment.

FIG. 4 is a diagram illustrating an example of data generated in entropy decoding and dictionary-based decompression performed by the data decompression device according to the embodiment.

FIG. 5 is a block diagram illustrating a configuration of a data compression device according to a first comparative example.

FIG. 7 is a block diagram illustrating a configuration of a data decompression device according to a second comparative example.

FIG. 8 is a flowchart illustrating the procedure of a block boundary determination process executed in the data decompression device according to the second comparative example.

FIG. 9 is a block diagram illustrating an example of a configuration of the data compression device according to the embodiment.

FIG. 10 is a flowchart illustrating an example of the procedure of an all-literal determination process executed in the data compression device according to the embodiment.

FIG. 11 is a block diagram illustrating an example of a configuration of the data decompression device according to the embodiment.

FIG. 12 is a flowchart illustrating an example of the procedure of a block boundary determination process executed in the data decompression device according to the embodiment.

DETAILED DESCRIPTION

In general, according to one embodiment, a data compression device includes all-literal determination circuitry and end-of-block symbol addition circuitry. In a case where dictionary-based compression on a first data block is performed, the all-literal determination circuitry determines whether all one or more symbols included in a second data block are literal symbols or not. The one or more symbols are obtained by performing the dictionary-based compression on the first data block. In a case where all the one or more symbols are literal symbols, end-of-block symbol addition circuitry does not add an end-of-block symbol to an end of the second data block. In a case where at least one symbol among the one or more symbols is not a literal symbol, the end-of-block symbol addition circuitry adds the end-of-block symbol to the end of the second data block.

Various embodiments will be described hereinafter with reference to the accompanying drawings.

Figure 1:
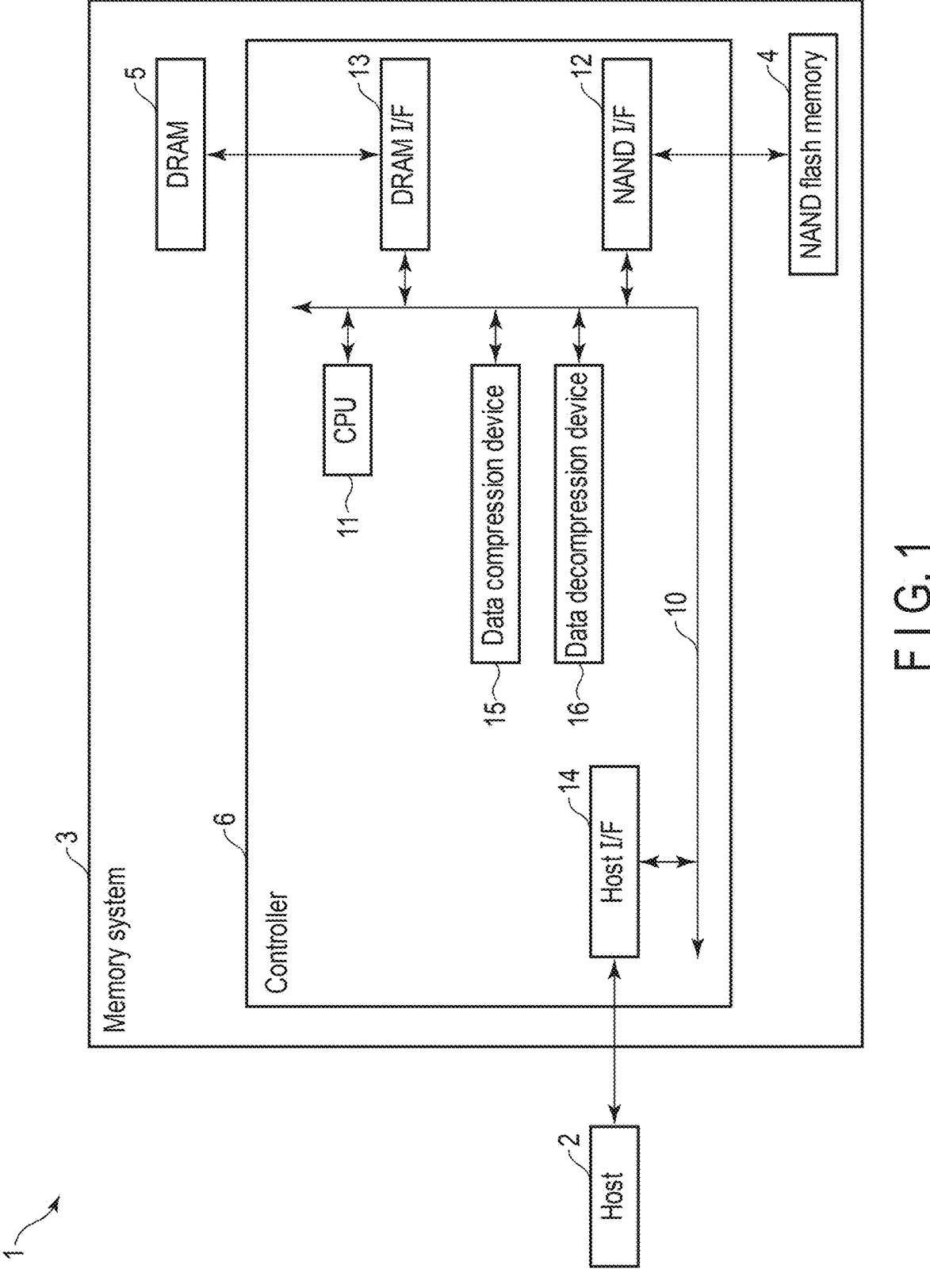
FIG. 1 is a block diagram illustrating an example of a configuration of an information processing system that includes a data compression device and a data decompression device according to an embodiment.

FIG. 1 illustrates an example of a configuration of an information processing system that includes a data compression device and a data decompression device according to an embodiment. The information processing system 1 includes a host device 2 and a memory system 3.

The host device 2 is an information processing device that stores data in the memory system 3. The host device 2 is, for example, a storage server that stores a large amount of various data in the memory system 3 or a personal computer. Hereinafter, the host device 2 is referred to as a host 2.

The memory system 3 is a semiconductor storage device configured to write data into a nonvolatile memory and read data from the nonvolatile memory. The nonvolatile memory is, for example, a NAND flash memory 4. The memory system 3 is implemented, for example, as a solid state drive (SSD). Hereinafter, a case where the memory system 3 is implemented as an SSD will be explained, but the memory system 3 may be implemented as a hard disk drive (HDD).

The memory system 3 may be used as a storage of the host 2. The memory system 3 may be provided inside the host 2 or may be connected to the host 2 via a cable or a network.

An interface for connecting the host 2 and the memory system 3 conforms to standards such as SCSI, Serial Attached SCSI (SAS), AT Attachment (ATA), Serial ATA (SATA), PCI Express™ (PCIe™), Ethernet™, Fibre channel, or NVM Express™ (NVMe™).

The memory system 3 includes, for example, a NAND flash memory 4, a dynamic random access memory (DRAM) 5, and a controller 6.

The NAND flash memory 4 includes one or more memory chips. Each of the memory chips includes multiple blocks. The blocks each function as a minimum unit of a data erase operation. A block may be referred to as an erase block or a physical block. Each of the blocks includes multiple pages.

Each of the pages includes multiple memory cells connected to a single word line. The pages each function as a unit of a data write operation and a data read operation. Note that a word line may also function as a unit of a data write operation and a data read operation.

The tolerable maximum number of program/erase cycles (maximum number of P/E cycles) for each of the blocks is limited. One P/E cycle of a block includes a data erase operation to erase data stored in all memory cells in the block and a data write operation to write data in each page of the block.

The DRAM 5 is a volatile memory. A storage area of the DRAM 5 is allocated as, for example, a storage area of firmware (FW), a cache area of a logical-to-physical address conversion table, and a buffer area of user data.

The controller 6 is a memory controller that controls the NAND flash memory 4 and the DRAM 5. The controller 6 is implemented with, for example, circuitry such as a system-on-a-chip (SoC). The controller 6 may include a static random access memory (SRAM) or a DRAM. In this case, the DRAM 5 outside the controller 6 may not be provided.

The controller 6 functions as, for example, a flash translation layer (FTL) configured to execute data management and block management of the NAND flash memory 4. The data management executed by the FTL includes (1) management of mapping information indicative of a relationship between each logical address and each physical address of the NAND flash memory 4, and (2) a process to hide a difference between data read/write operations in units of page and data erase operations in units of block. The block management includes management of defective blocks, wear leveling, and garbage collection.

The logical address is used by the host 2 for addressing a storage area of the memory system 3. The logical address is, for example, a logical block address (LBA).

Management of mapping between each logical address and each physical address is executed, for example, by using the logical-to-physical address conversion table. The controller 6 uses the logical-to-physical address conversion table to manage the mapping between each logical address and each physical address with a certain management size. A physical address corresponding to a logical address indicates a physical memory location in the NAND flash memory 4 to which user data of the logical address is written. The logical-to-physical address conversion table may be loaded from the NAND flash memory 4 to the DRAM 5 when the memory system 3 is boot up.

The data write operation into one page is executable only once in a single P/E cycle. Thus, the controller 6 writes updated data corresponding to a logical address not to an original physical memory location in which previous data corresponding to the logical address is stored but to a different physical memory location. Then, the controller 6 updates the logical-to-physical address conversion table to associate the logical address with this different physical memory location and to invalidate the previous data.

The controller 6 includes, for example, a CPU 11, a NAND interface (NAND I/F) 12, a DRAM interface (DRAM I/F) 13, a host interface (host I/F) 14, a data compression device 15, and a data decompression device 16. The CPU 11, the NAND I/F 12, the DRAM I/F 13, the host I/F 14, the data compression device 15, and the data decompression device 16 are connected via, for example, a bus 10.

The CPU 11 is a processor configured to control the NAND I/F 12, the DRAM I/F 13, the host I/F 14, the data compression device 15, and the data decompression device 16. The CPU 11 performs various processes by executing the FW loaded from the NAND flash memory 4 to the DRAM 5. The FW is a control program that includes instructions to cause the CPU 11 to execute the various processes. The CPU 11 executes, in addition to the above-described processes of FTL, command processes to process various commands received from the host 2. The operation of the CPU 11 is controlled by the FW executed by the CPU 11. Note that part or the entire FTL processes and command processes may be executed by dedicated hardware in the controller 6.

The NAND I/F 12 electrically connects the controller 6 and the NAND flash memory 4. The NAND I/F 12 conforms to an interface standard such as a toggle DDR and an open NAND flash interface (ONFI).

The NAND I/F 12 functions as NAND control circuitry configured to control the NAND flash memory 4. The NAND I/F 12 may be connected to the memory chips in the NAND flash memory 4 via multiple channels. By operating the memory chips in parallel, it is possible to broaden an access bandwidth between the controller 6 and the NAND flash memory 4.

The DRAM I/F 13 functions as DRAM control circuitry configured to control access to the DRAM 5.

The host I/F 14 is circuitry that functions as an interface that performs communication between the memory system 3 and the host 2. The host I/F 14 includes circuitry that receives various commands (for example, an input/output (I/O) command and a control command) and data from the host 2. The I/O command is, for example, a write command or a read command. The control command is, for example, an unmap command (trim command) or a format command. The host I/F 14 includes circuitry that transmits, to the host 2, a response to a command and data.

The data compression device 15 is an encoder that compresses data by encoding. Data to be compressed is, for example, data to be written into the NAND flash memory 4. The CPU 11 inputs, for example, data to be written received in accordance with a write command received from the host 2, to the data compression device 15 as plain text data (uncompressed data). The data compression device 15 encodes the plain text data input from the CPU 11, thereby generating a compressed stream (compressed data).

Specifically, for example, the data compression device 15 performs dictionary-based compression on symbols included in the plain text data, thereby acquiring symbols. Hereinafter, the symbols acquired by the dictionary-based compression are also referred to as dictionary-compressed symbols. The data compression device 15 performs entropy coding on the dictionary-compressed symbols, thereby generating the compressed stream that includes variable-length codes.

The dictionary-based compression is a coding scheme in which data to be compressed is converted into a pointer by using a history buffer that stores data (that is, symbol string) input in the past. The dictionary-based compression is also referred to as dictionary-based coding. The pointer includes, for example, a match distance and a match length. In the dictionary-based compression, the history buffer is searched to acquire past data that matches at least part of the data to be compressed, and a match distance and a match length are obtained. The match distance is a distance from a position where the data to be compressed is to be stored to a position where the acquired past data is stored in the history buffer. The match length is the length of a matching portion between the acquired past data and the data to be compressed. The data to be compressed is converted into the pointer (that is, the match distance and the match length) and thus the data can be compressed. The pointer obtained by the dictionary-based compression is referred to as a dictionary match symbol or a match symbol.

Note that in a case where past data that matches at least part of the data to be compressed is not found in the history buffer, the data (symbol) to be compressed is output as it is. A symbol that is not converted into a pointer by the dictionary-based compression and is output as it is, is referred to as a dictionary mismatch symbol or a literal symbol.

Therefore, the dictionary-compressed symbols, which are acquired by the dictionary-based compression on the symbols included in the plain text data, include at least one of a dictionary mismatch symbol (literal symbol) and a dictionary match symbol (match symbol).

The entropy coding is a variable-length coding scheme for generating a coding table by using frequencies of occurrence of symbols to be coded (for example, dictionary-compressed symbols) for each symbol. The entropy coding is defined in DEFLATE, for example. The coding table includes information indicative of N types of symbols and N code words that are associated with the N types of symbols, respectively. In the entropy coding, a short code word is assigned to a symbol whose frequency of occurrence is high, and a long code word is assigned to a symbol whose frequency of occurrence is low. In the entropy coding, an input symbol is converted into a code word according to such assignment. Accordingly, the code word obtained by the conversion is a variable-length code. Note that, the symbol is, for example, data of a fixed length. Therefore, in the entropy coding, the amount of data can be reduced by using a distribution of the frequencies of occurrence of the symbols. A compressed stream generated by the entropy coding includes a code word obtained by converting each of the dictionary-compressed symbols. The compressed stream may further include, as a header, data indicative of the coding table used for the entropy coding. The data indicative of the coding table is used to restore the coding table in a case where the compressed stream is decompressed.

The data decompression device 16 is a decoder that decompresses a compressed stream by decoding. The compressed stream is, for example, data read from the NAND flash memory 4. For example, the CPU 11 inputs a compressed stream read from the NAND flash memory 4 in accordance with a read command received from the host 2, to the data decompression device 16. The data decompression device 16 decodes the compressed stream input from the CPU 11, thereby generating uncompressed data (plain text data).

Specifically, for example, the data decompression device 16 performs entropy decoding on code words included in the compressed stream, thereby acquiring dictionary-compressed symbols. Then, the data decompression device 16 performs dictionary-based decompression on the dictionary-compressed symbols, thereby generating plain text data that includes symbols (literal symbols).

The entropy decoding is a decoding scheme for restoring a coding table by using data included in a header of a compressed stream and converting a code word included in the compressed data into a symbol (dictionary-compressed symbol) on the basis of the coding table.

The dictionary-based decompression is a decoding scheme in which a match symbol included in a dictionary-compressed symbol string to be decoded is converted into plain text data (that is, literal symbol string) by using a history buffer that stores plain text data generated (obtained by decoding) in the past. Note that since a literal symbol included in the dictionary-compressed symbol string is a symbol that is not dictionary-compressed, the literal symbol is output as it is. The dictionary-based decompression is also referred to as dictionary-based decoding.

FIG. 2 illustrates an example of a compressed stream 33 output from the data compression device 15 or input to the data decompression device 16. The compressed stream 33 may include a code word M corresponding to a match symbol and a code word L corresponding to a literal symbol.

The match symbol is a pointer with which a symbol string (byte string) to be compressed is replaced in a case where the history buffer is searched and then a past symbol string that matches at least part of the symbol string to be compressed is found. The literal symbol is a symbol that is output as it is without being replaced with a pointer (match symbol) in a case where the history buffer is searched but a past symbol string that matches any part of a symbol string to be compressed is not found.

In a case where at least some symbols in the symbol string to be compressed are replaced with a match symbol, the number of symbols in a compressed symbol string is smaller than that in the symbol string to be compressed (that is, a symbol string in which all symbols remain as literal symbols).

The data compression device 15 compresses, for example, uncompressed data for each specific unit. Uncompressed data of the specific unit is also referred to as a Huffman block. The Huffman block has a specific data size. That is, the Huffman block includes a specific number of symbols. The specific data size is freely determined, for example, in the information processing system 1 (more specifically, the data compression device 15 and the data decompression device 16). The data compression device 15 changes (switches) a coding table used for the entropy coding, for example, for each Huffman block.

The data compression device 15 may add an end-of-block (EOB) symbol to the end of each Huffman block in order to detect the boundary of Huffman blocks. The EOB symbol is a symbol indicative of the end of a Huffman block. As the EOB symbol, a value (bit string) defined in DEFLATE is used, for example. The data decompression device 16 may change a coding table used for the entropy decoding, for example, in response to detection of the EOB symbol.

With reference to FIGS. 3 and 4, a case where an EOB symbol is added to the end of a Huffman block will be specifically described.

FIG. 3 illustrates an example of data generated in the dictionary-based compression and the entropy coding by the data compression device 15. Here, it is assumed that uncompressed data 31 corresponds to one Huffman block.

The uncompressed data 31 input to the data compression device 15 is converted into a dictionary-compressed symbol string 32 by the dictionary-based compression. Specifically, in a byte string of the uncompressed data 31, a byte string that matches a past byte string (i.e., byte string in the history buffer) is replaced with a pointer to the matched past byte string (match symbol). On the other hand, in the byte string of the uncompressed data 31, a byte string for which a matched past byte string is not found is output as the byte string uncompressed (literal symbol) itself.

In the example illustrated in FIG. 3, eight symbols included in the uncompressed data 31 are converted into the dictionary-compressed symbol string 32 that includes five dictionary-compressed symbols by the dictionary-based compression. The dictionary-compressed symbol string 32 includes two match symbols and three literal symbols. Thus, the uncompressed data 31 may be compressed into the dictionary-compressed symbol string 32 that includes the decreased number of symbols by the dictionary-based compression.

Then, an EOB symbol is added to the tail of the dictionary-compressed symbol string 32. The dictionary-compressed symbol string 32 and the added EOB symbol are converted into a compressed stream 33 by the entropy coding. Specifically, the dictionary-compressed symbol string 32 and the EOB symbol are converted into variable-length codes for each symbol by the entropy coding.

In the example illustrated in FIG. 3, the compressed stream 33 includes six variable-length codes that are obtained by performing the entropy coding on each symbol of the three literal symbols, the two match symbols, and the EOB symbol. Thus, the dictionary-compressed symbol string 32 is compressed into the compressed stream 33 having the reduced data amount by the entropy coding. That is, the compressed stream 33 is data obtained by compressing the uncompressed data 31 (here, one Huffman block) with the dictionary-based compression and the entropy coding.

As described above, the EOB symbol may be used for detecting the boundary of Huffman blocks at the time of decoding by the data decompression device 16. In response to the detection of the boundary of Huffman blocks, the data decompression device 16 changes (switches) a coding table used for decoding.

FIG. 4 illustrates an example of data generated in the entropy decoding and the dictionary-based decompression by the data decompression device 16. The data decompression device 16 decompresses the compressed stream 33 for each specific unit (Huffman block).

The compressed stream 33 input to the data decompression device 16 is converted into the dictionary-compressed symbol string 32 by the entropy decoding. Specifically, the variable-length codes included in the compressed stream 33 are converted into the dictionary-compressed symbol string 32 and the EOB symbol by the entropy decoding. When the EOB symbol has been obtained, the boundary of Huffman blocks in the compressed stream 33 is detected. The EOB symbol is excluded from the output dictionary-compressed symbol string 32.

In the example illustrated in FIG. 4, by performing the entropy decoding on the six variable-length codes included in the compressed stream 33, the three literal symbols, the two match symbols, and the EOB symbol are obtained. Among them, the three literal symbols and the two match symbols are output as the dictionary-compressed symbol string 32 according to the decoded order.

Next, the dictionary-compressed symbol string 32 is converted into the uncompressed data 31 by the dictionary-based decompression. Specifically, each of the match symbols in the dictionary-compressed symbol string 32 is replaced with a past byte string (for example, byte string in the history buffer) indicated by its pointer and is output as the uncompressed data 31. In contrast, since each of the literal symbols in the dictionary-compressed symbol string 32 is an uncompressed byte string, the literal symbols are output as they are, as the uncompressed data 31. That is, the uncompressed data 31 is data obtained by decompressing the compressed stream 33 (here, compressed data corresponding to one Huffman block) with the entropy decoding and the dictionary-based decompression.

In the example illustrated in FIG. 4, the five dictionary-compressed symbols included in the dictionary-compressed symbol string 32 are converted into the uncompressed data 31 that includes the eight symbols (literal symbols) by the dictionary-based decompression. Thus, the dictionary-compressed symbol string 32 may be decompressed into the uncompressed data 31 that includes the increased number of symbols by the dictionary-based decompression. That is, the uncompressed data 31 is data obtained by decompressing the compressed stream 33 with the entropy decoding and the dictionary-based decompression.

In a case where the EOB symbol is added to the end of the Huffman block (more specifically, the dictionary-compressed symbol string corresponding to the Huffman block), the throughput of the data compression device 15 decreases due to an operation for performing the entropy coding on the EOB symbol. Similarly, the throughput of the data decompression device 16 decreases due to an operation for performing the entropy decoding on the variable-length code that corresponds to the EOB symbol. In addition, since the compressed stream 33 includes the variable-length code that corresponds to the EOB symbol, the data amount of the compressed stream 33 increases and thus the compression efficiency decreases.

The decrease in the throughput due to the addition of the EOB symbol will be described by using the data decompression device 16 configured to perform the entropy decoding on a symbol per cycle as an example. Here, it is assumed that the size of a Huffman block is 8192 bytes.

In a case where a dictionary-compressed symbol string corresponding to the Huffman block includes at least one match symbol, the number of symbols (variable-length codes) to be entropy-decoded is equal to or smaller than 8192. In this case, the number of cycles required for the entropy decoding of the Huffman block is suppressed to 8192 cycles or less.

In contrast, in a case where all symbols in the dictionary-compressed symbol string corresponding to the Huffman block are literal symbols, the dictionary-compressed symbol string includes 8192 literal symbols. Then, in a case where the EOB symbol is added to the tail of the dictionary-compressed symbol string, the number of symbols (variable-length codes) to be entropy-decoded becomes 8193. In this case, the number of cycles required for the entropy decoding of the Huffman block is 8193 cycles, and thus the throughput in the entropy decoding decreases.

First Comparative Example

An example in which throughput decreases in the entropy coding and the entropy decoding will be explained by using a data compression device and a data decompression device according to a first comparative example.

FIG. 5 is a block diagram illustrating a configuration of the data compression device according to the first comparative example. The data compression device 15C is a compressor (encoder) that compresses uncompressed data 31C into a compressed stream 33C-1 by the dictionary-based compression and the entropy coding. The uncompressed data 31C is, for example, data to be compressed that includes one or more Huffman blocks. The data compression device 15C includes a dictionary-based compression unit 21C and an entropy coding unit 22C.

The dictionary-based compression unit 21C generates a dictionary-compressed symbol string 32C by performing the dictionary-based compression on the uncompressed data 31C. Each symbol in the dictionary-compressed symbol string 32C is either a literal symbol or a match symbol. The dictionary-based compression unit 21C sends the generated dictionary-compressed symbol string 32C to the entropy coding unit 22C.

The entropy coding unit 22C converts each symbol in the dictionary-compressed symbol string 32C into a variable-length code by the entropy coding, thereby generating the compressed stream 33C-1. The entropy coding unit 22C includes an EOB symbol addition unit 221C, a coding table generation unit 222C, and a variable-length coding unit 223C.

The EOB symbol addition unit 221C adds an EOB symbol to the tail of a dictionary-compressed symbol string 32C that corresponds to a Huffman block. Specifically, for example, every time the EOB symbol addition unit 221C receives a dictionary-compressed symbol from the dictionary-based compression unit 21C, the EOB symbol addition unit 221C acquires the size of data on which the dictionary-based compression to obtain the dictionary-compressed symbol was performed, and calculates the cumulative value of the acquired size (hereinafter, the cumulative value is referred to as an uncompressed data size). In a case where the dictionary-compressed symbol is a literal symbol, the size of data on which the dictionary-based compression to obtain the dictionary-compressed symbol was performed is, for example, 1 byte. In a case where the dictionary-compressed symbol is a match symbol, the size of data on which the dictionary-based compression to obtain the dictionary-compressed symbol was performed is, for example, a match length in bytes indicated by the match symbol. Hereinafter, the size of data on which the dictionary-based compression to obtain the dictionary-compressed symbol was performed is also referred to as a data size.

The EOB symbol addition unit 221C sends the dictionary-compressed symbol for which the data size has been acquired, to the coding table generation unit 222C and the variable-length coding unit 223C. Then, when the calculated uncompressed data size has reached a specific size, the EOB symbol addition unit 221C adds an EOB symbol. That is, the EOB symbol addition unit 221C sends the EOB symbol after the latest dictionary-compressed symbol for which the data size has been acquired, to the coding table generation unit 222C and the variable-length coding unit 223C. The specific size is, for example, the size of one Huffman block (hereinafter, also referred to as a block size) indicated by block size information 41C. Accordingly, the EOB symbol addition unit 221C can add the EOB symbol to the end of the dictionary-compressed symbol string 32C that corresponds to the Huffman block.

The coding table generation unit 222C generates a coding table 42C based on a frequency of occurrence of each of symbols (more specifically, one or more dictionary-compressed symbols and an EOB symbol at the tail) that correspond to one Huffman block and are received from the EOB symbol addition unit 221C. Specifically, the coding table generation unit 222C assigns a short code word to a symbol whose frequency of occurrence is high, and assigns a long code word to a symbol whose frequency of occurrence is low. The coding table generation unit 222C sends the generated coding table 42C to the variable-length coding unit 223C. In addition, the coding table generation unit 222C outputs data indicative of the coding table 42C as a header portion 331C-1 of the compressed stream 33C-1.

Note that in the symbols that correspond to the Huffman block, a frequency of occurrence of the EOB symbol is one. Therefore, the coding table generation unit 222C may assign, to the EOB symbol, a variable-length code having the longest code length in the coding table 42C.

The variable-length coding unit 223C generates variable-length codes that respectively correspond to the symbols corresponding to the Huffman block, by variable-length coding. Specifically, the variable-length coding unit 223C converts each of the symbols corresponding to the Huffman block into a variable-length code on the basis of the coding table 42C. The variable-length coding unit 223C sequentially outputs the variable-length codes converted from the symbols as a payload portion 332C-1 of the compressed stream 33C-1. At the tail of the payload portion 332C-1, a variable-length code 333C converted from the EOB symbol is stored. As described above, the longest variable-length code may be assigned to the EOB symbol. Therefore, the ratio of the size (code amount) of the variable-length code 333C converted from the EOB symbol to the data size of the payload portion 332C-1 is large.

Note that when having received symbols that correspond to the next Huffman block from the EOB symbol addition unit 221C, the coding table generation unit 222C generates a new coding table 42C and sends the new coding table 42C to the variable-length coding unit 223C. In other words, in response to receiving the EOB symbol from the EOB symbol addition unit 221C, the coding table generation unit 222C changes the coding table 42C. The variable-length coding unit 223C converts each of the symbols corresponding to the next Huffman block into a variable-length code by using the new coding table 42C.

Therefore, the compressed stream 33C-1 includes, for each Huffman block, the header portion 331C-1 that includes the coding table 42C, and the payload portion 332C-1 that is obtained by performing the variable-length coding on the dictionary-compressed symbol string 32C and the EOB symbol.

In the data compression device 15C, in a case where all symbols in the dictionary-compressed symbol string 32C corresponding to the Huffman block are literal symbols, the throughput decreases due to, for example, one-cycle of calculation in which the variable-length coding unit 223C performs the entropy coding on the EOB symbol. Note that the data compression device 15C may be configured to require multiple cycles for performing the entropy coding on one symbol (here, the EOB symbol). In addition, since the compressed stream 33C-1 includes the variable-length code corresponding to the EOB symbol, the data amount of the compressed stream 33C-1 increases.

Figure 6:
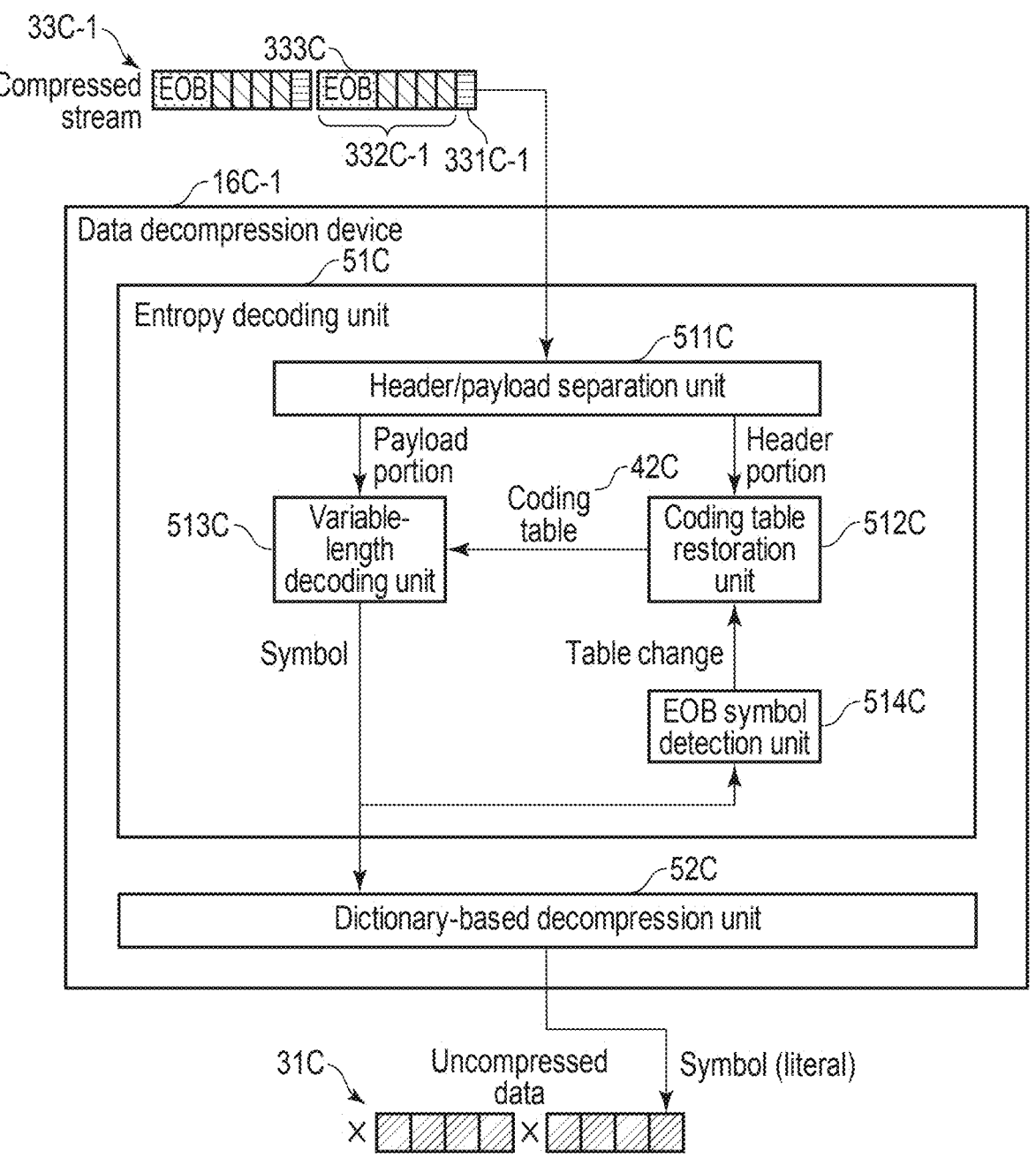
FIG. 6 is a block diagram illustrating a configuration of a data decompression device according to the first comparative example.

FIG. 6 is a block diagram illustrating a configuration of the data decompression device according to the first comparative example. The data decompression device 16C-1 is a decompressor (decoder) that decompresses the compressed stream 33C-1 into the uncompressed data 31C by the entropy decoding and the dictionary-based decompression. The compressed stream 33C-1 is data to be decompressed and corresponds to one or more Huffman blocks. The data decompression device 16C-1 includes an entropy decoding unit 51C and a dictionary-based decompression unit 52C.

The entropy decoding unit 51C generates a dictionary-compressed symbol string 32C from the compressed stream 33C-1 by the entropy decoding. The entropy decoding unit 51C includes a header/payload separation unit 511C, a coding table restoration unit 512C, a variable-length decoding unit 513C, and an EOB symbol detection unit 514C.

The header/payload separation unit 511C separates the header portion 331C-1 and the payload portion 332C-1 included in the compressed stream 33C-1. The header/payload separation unit 511C sends the header portion 331C-1 to the coding table restoration unit 512C. The header/payload separation unit 511C sends the payload portion 332C-1 subsequent to the header portion 331C-1, to the variable-length decoding unit 513C.

The coding table restoration unit 512C restores (generates) a coding table 42C by using data included in the header portion 331C-1. The coding table restoration unit 512C sends the restored coding table 42C to the variable-length decoding unit 513C.

The variable-length decoding unit 513C generates symbols that respectively correspond to variable-length codes included in the payload portion 332C-1 by the variable-length decoding. Specifically, the variable-length decoding unit 513C converts each of the variable-length codes included in the payload portion 332C-1 into a symbol on the basis of the coding table 42C. The symbol obtained by the conversion is either a dictionary-compressed symbol or an EOB symbol. The variable-length decoding unit 513C sequentially sends the generated symbols to the EOB symbol detection unit 514C and the dictionary-based decompression unit 52C.

The EOB symbol detection unit 514C detects the EOB symbol from the symbols received from the variable-length decoding unit 513C. Specifically, when a symbol received from the variable-length decoding unit 513C matches the value of the EOB symbol, the EOB symbol detection unit 514C detects the symbol as the EOB symbol. In response to the detection of the EOB symbol, the EOB symbol detection unit 514C notifies the coding table restoration unit 512C of change of the coding table 42C.

In response to the notification by the EOB symbol detection unit 514C, the coding table restoration unit 512C restores a new coding table 42C by using data included in the next header portion received from the header/payload separation unit 511C. The variable-length decoding unit 513C converts each of variable-length codes included in the subsequent payload portion into a symbol by using the new coding table 42C.

The dictionary-based decompression unit 52C generates the uncompressed data 31C by performing the dictionary-based decompression on the dictionary-compressed symbol received from the variable-length decoding unit 513C. Specifically, in a case where the dictionary-compressed symbol is a match symbol, the dictionary-based decompression unit 52C outputs a past byte string indicated by its pointer, as the uncompressed data 31C. In a case where the dictionary-compressed symbol is a literal symbol, the dictionary-based decompression unit 52C outputs the literal symbol as it is, as the uncompressed data 31C. Note that the dictionary-based decompression unit 52C does not output the EOB symbol received from the variable-length decoding unit 513C, as the uncompressed data 31C. In the uncompressed data 31C illustrated in FIG. 6, "x" represents that the EOB symbol is not output as the uncompressed data 31C.

In the data decompression device 16C-1, in a case where all symbols in the dictionary-compressed symbol string corresponding to the Huffman block are literal symbols, the throughput decreases due to, for example, one-cycle of operation in which the variable-length decoding unit 513C performs the entropy decoding on the variable-length code corresponding to the EOB symbol.

For example, it is assumed that the variable-length decoding unit 513C is configured to perform the entropy decoding on one symbol per cycle. In this case, if the decoding of the variable-length code corresponding to the EOB symbol is not considered, the decompression throughput at the time of outputting the uncompressed data 31C can be guaranteed to be 1 byte per cycle, even in the worst case where the number of symbols to be decoded is maximum because all symbols in the dictionary-compressed symbol string are literal symbols. However, if the variable-length code corresponding to the EOB symbol is further decoded, one additional cycle for this decoding is required, and thus, the decompression throughput at the time of outputting the same uncompressed data 31C becomes less than 1 byte per cycle, thereby decreasing.

Therefore, in the data decompression device 16C-1 of the first comparative example, the throughput decreases in a case where all symbols in the dictionary-compressed symbol string corresponding to the Huffman block are literal symbols.

Second Comparative Example

Note that in a system that compresses and decompresses data, a unit of data to be compressed, that is, the size of a Huffman block may be designated as, for example, 4 KiB, 8 KiB, or the like. In that case, even if a compressed stream includes no EOB symbol, the boundary between Huffman blocks (that is, the end of each Huffman block) may be detected on the basis of the size (for example, the number of bytes) of uncompressed data obtained by decoding the compressed stream.

Therefore, as a data decompression device according to a second comparative example, a data decompression device that detects the boundary between Huffman blocks on the basis of the size of uncompressed data obtained by decoding a compressed stream will be explained.

FIG. 7 is a block diagram illustrating a configuration of the data decompression device according to the second comparative example. Similarly to the data decompression device 16C-1 of the first comparative example, the data decompression device 16C-2 of the second comparative example is a decompressor that decompresses a compressed stream 33C-2 into the uncompressed data 31C by the entropy decoding and the dictionary-based decompression. The data decompression device 16C-2 of the second comparative example is different from the data decompression device 16C-1 of the first comparative example in terms of including a block boundary determination unit 515C instead of the EOB symbol detection unit 514C. Hereinafter, the difference from the data decompression device 16C-1 of the first comparative example will be mainly described.

The compressed stream 33C-2 corresponds to one or more Huffman blocks. The compressed stream 33C-2 does not include a variable-length code corresponding to an EOB symbol. Specifically, the compressed stream 33C-2 includes, for each Huffman block, a header portion 331C-2 that includes a coding table 42C, and a payload portion 332C-2 that includes variable-length codes corresponding to dictionary-compressed symbols.

The coding table restoration unit 512C restores a coding table 42C by using data included in the header portion 331C-2. The coding table restoration unit 512C sends the restored coding table 42C to the variable-length decoding unit 513C.

The variable-length decoding unit 513C converts each of the variable-length codes included in the payload portion 332C-2 into a dictionary-compressed symbol, based on the coding table 42C. The variable-length decoding unit 513C sends the dictionary-compressed symbol to the dictionary-based decompression unit 52C and the block boundary determination unit 515C.

Every time the block boundary determination unit 515C receives a dictionary-compressed symbol from the variable-length decoding unit 513C, the block boundary determination unit 515C acquires the size (data size) of data to be obtained by performing the dictionary-based decompression on the dictionary-compressed symbol, and calculates the cumulative value of the acquired size (uncompressed data size). In a case where the dictionary-compressed symbol is a literal symbol, the size of data to be obtained by performing the dictionary-based decompression on the dictionary-compressed symbol is, for example, 1 byte. In a case where the dictionary-compressed symbol is a match symbol, the size of data to be obtained by performing the dictionary-based decompression on the dictionary-compressed symbol is, for example, a match length in bytes indicated by the match symbol. When the calculated cumulative value of the uncompressed data size has reached a specific size, the block boundary determination unit 515C determines that the latest dictionary-compressed symbol for which the data size has been acquired is the end of a Huffman block. The specific size is, for example, the size of one Huffman block (block size) indicated by the block size information 41C. Accordingly, the block boundary determination unit 515C can detect the boundary between Huffman blocks. In response to the detection of the boundary between the Huffman blocks, the block boundary determination unit 515C notifies the coding table restoration unit 512C of change of the coding table 42C.

With reference to the flowchart of FIG. 8, a process by the block boundary determination unit 515C will be specifically described. FIG. 8 is a flowchart illustrating the procedure of a block boundary determination process executed in the data decompression device 16C-2 according to the second comparative example. The block boundary determination unit 515C performs the block boundary determination process when the compressed stream 33C-2 has been input to the data decompression device 16C-2, for example.

First, the block boundary determination unit 515C initializes an uncompressed data size DS (step S101). That is, the block boundary determination unit 515C sets the uncompressed data size DS to zero.

Next, the block boundary determination unit 515C receives a dictionary-compressed symbol from the variable-length decoding unit 513C (step S102). Then, the block boundary determination unit 515C determines whether the type of the received dictionary-compressed symbol is a literal symbol or a match symbol (step S103).

In a case where the received dictionary-compressed symbol is a match symbol ("Match" in step S103), the block boundary determination unit 515C adds a match length indicated by the match symbol to the uncompressed data size DS (step S104) and proceeds to step S106.

In a case where the received dictionary-compressed symbol is a literal symbol ("Literal" in step S103), the block boundary determination unit 515C adds one to the uncompressed data size DS (step S105) and proceeds to step S106.

Next, the block boundary determination unit 515C determines whether the uncompressed data size DS is equal to or larger than the block size (step S106). For example, the block boundary determination unit 515C acquires the block size from the block size information 41C that is stored in advance in the data decompression device 16C-2.

In a case where the uncompressed data size DS is smaller than the block size (No in step S106), the process by the block boundary determination unit 515C returns to step S102. That is, the block boundary determination unit 515C further performs a process of receiving a dictionary-compressed symbol from the variable-length decoding unit 513C and detecting the boundary between Huffman blocks depending on whether the uncompressed data size DS has reached the block size.

In a case where the uncompressed data size DS is equal to or larger than the block size (Yes in step S106), the block boundary determination unit 515C determines that the boundary between the current Huffman block and the next Huffman block has been detected, outputs a block boundary flag to the coding table restoration unit 512C (step S107), and returns to step S101.

The block boundary flag is information indicating that the latest dictionary-compressed symbol received from variable-length decoding unit 513C is the end of the Huffman block. The block boundary flag is used to instruct the coding table restoration unit 512C to change the coding table 42C. In response to receiving the block boundary flag, the coding table restoration unit 512C acquires a subsequent header portion in the compressed stream 33C-2. The coding table restoration unit 512C generates a new coding table 42C by using the acquired header portion and changes the previous coding table 42C for the new coding table 42C. Accordingly, the variable-length decoding unit 513C decodes the subsequent variable-length codes (payload portion) in the compressed stream 33C-2 into dictionary-compressed symbols by using the new coding table 42C.

In the data decompression device 16C-2 of the second comparative example, in order not to decrease the throughput of the variable-length decoding (for example, decoding a symbol per cycle), it is necessary to execute the variable-length decoding, the block boundary determination, and the change of the coding table 42C in one cycle. However, since the operation for calculating the uncompressed data size DS in the block boundary determination unit 515C is added, it is necessary to lower the maximum operation frequency of the entropy decoding unit 51C by the latency occurred by this operation. Therefore, the throughput of the variable-length decoding may decrease. That is, as illustrated in FIG. 7, a series of operations including the variable-length decoding, the block boundary determination, and the change of the coding table 42C becomes a critical path related to the throughput of the variable-length decoding.

As described above with reference to the flowchart of FIG. 8, when having received a dictionary-compressed symbol obtained by the variable-length decoding as an input, the block boundary determination unit 515C determines the type of the dictionary-compressed symbol. The block boundary determination unit 515C adds a value depending on the type of the received dictionary-compressed symbol, to the uncompressed data size DS that indicates the cumulative value of the size of data to be obtained by performing the dictionary-based decompression on each of dictionary-compressed symbols corresponding to a Huffman block. That is, in a case where the received dictionary-compressed symbol is a match symbol, the block boundary determination unit 515C adds its match length (for example, match length in bytes) to the uncompressed data size DS. In contrast, in a case where the received dictionary-compressed symbol is a literal symbol, the block boundary determination unit 515C adds 1 byte to the uncompressed data size DS. Then, the block boundary determination unit 515C determines whether the received dictionary-compressed symbol corresponds to a boundary between Huffman blocks, based on the updated uncompressed data size DS.

In such determination of the boundary between Huffman blocks by the block boundary determination unit 515C, the necessary number of logical steps of operations increases. In this case, the latency caused by the block boundary determination unit 515C implemented as circuitry becomes long. Therefore, in the data decompression device 16C-2 of the second comparative example, there is a possibility that the operation frequency becomes low and thus the throughput decreases.

On the other hand, the data compression device 15 and the data decompression device 16 according to the embodiment can improve the processing throughput and the compression efficiency.

Specifically, in a case where all one or more symbols obtained by the dictionary-based compression on a Huffman block are literal symbols, the data compression device 15 does not add an EOB symbol to the end of the one or more symbols. Accordingly, since the number of symbols on which the entropy coding is to be performed is reduced, the data compression device 15 can improve the coding throughput and the compression efficiency.

In addition, in a case where all the one or more symbols obtained by the dictionary-based compression on the Huffman block are literal symbols in the data compression device 15, the data decompression device 16 can detect the end of the Huffman block on the basis of the number of the literal symbols that are obtained by performing the variable-length decoding on a compressed stream. Accordingly, the data decompression device 16 needs neither the processing cycle of decoding for the EOB symbol in the data decompression device 16C-1 of the first comparative example nor the calculation of the uncompressed data size DS depending on the type of a dictionary-compressed symbol obtained by the variable-length decoding in the data decompression device 16C-2 of the second comparative example. Therefore, the data decompression device 16 can improve the decoding throughput.

A configuration and an operation of each of the data compression device 15 and the data decompression device 16 will be described with reference to FIGS. 9 to 12.

(Data Compression Device 15)

FIG. 9 is a block diagram illustrating an example of a configuration of the data compression device 15 according to the embodiment. The data compression device 15 is a compressor that compresses uncompressed data 31 into a compressed stream 33 by the dictionary-based compression and the entropy coding. The uncompressed data 31 is, for example, data to be compressed that includes one or more Huffman blocks. The data compression device 15 includes a dictionary-based compression unit 21 and an entropy coding unit 22.

The dictionary-based compression unit 21 converts the uncompressed data 31 into a dictionary-compressed symbol string 32 by the dictionary-based compression. Each symbol in the dictionary-compressed symbol string 32 is either a literal symbol or a match symbol. The dictionary-based compression unit 21 sends the dictionary-compressed symbol string 32 to the entropy coding unit 22.

The entropy coding unit 22 converts each symbol in the dictionary-compressed symbol string 32 into a variable-length code by the entropy coding, thereby generating the compressed stream 33. The entropy coding unit 22 includes, for example, an all-literal determination unit 224, an EOB symbol addition unit 221, a coding table generation unit 222, and a variable-length coding unit 223.

The dictionary-based compression unit 21, the EOB symbol addition unit 221, the coding table generation unit 222, the variable-length coding unit 223, and the all-literal determination unit 224 are implemented by at least one of a register, an adder, a multiplier, a selector, and other arithmetic units. The register is, for example, implemented by a logical circuit such as a flip-flop. The adder, the multiplier, the selector, and the other arithmetic units are implemented by, for example, a logical circuit.

The all-literal determination unit 224 determines whether all one or more dictionary-compressed symbols in a dictionary-compressed symbol string 32) contiguously received from the dictionary-based compression unit 21 after a first timing are literal symbols or not. The first timing is a timing at which a data compression process in the data compression device 15 is started, or a timing at which the end of a Huffman block is notified by the EOB symbol addition unit 221 (a timing at which an end-of-block flag described later is received). In a case where the dictionary-based compression on a Huffman block (first data block) is performed, the dictionary-compressed symbol string 32 is, for example, one or more dictionary-compressed symbols included in a data block (second data block) that is obtained by performing the dictionary-based compression on the Huffman block. For example, the all-literal determination unit 224 determines whether or not all symbols in the dictionary-compressed symbol string 32 are literal symbols, based on whether or not a byte value of each symbol of the dictionary-compressed symbol string 32 matches a predetermined byte value of any of literal symbols (for example, a byte value of any of literal symbols defined in DEFLATE).

The all-literal determination unit 224 sends, to the EOB symbol addition unit 221, information indicating whether or not all symbols in the dictionary-compressed symbol string 32 are literal symbols (hereinafter, also referred to as all-literal determination information). The all-literal determination information is, for example, information indicative of either "true" or "false". As a value indicative of "true", for example, one is used. As a value indicative of "false", for example, zero is used. More specifically, the all-literal determination unit 224 sends a signal including the all-literal determination information to the EOB symbol addition unit 221, for example, at all times or at regular intervals.

In addition, the end-of-block flag is sent to the all-literal determination unit 224 by the EOB symbol addition unit 221. The end-of-block flag is information indicative of the end of a Huffman block (that is, information indicating that the end of the target dictionary-compressed symbol string 32 corresponds to the end of a Huffman block). When the end-of-block flag has been sent by the EOB symbol addition unit 221, the all-literal determination unit 224 may output the current all-literal determination information as the header portion 331. The all-literal determination information is used, for example, in the data decompression device 16, to determine whether or not a Huffman block that corresponds to dictionary-compressed symbols obtained by performing the entropy decoding on the compressed stream 33 is a Huffman block whose all symbols are literal symbols.

In a case where the all-literal determination information indicates "false", the EOB symbol addition unit 221 adds an EOB symbol to the end (tail) of a dictionary-compressed symbol string 32 that corresponds to a Huffman block.

Specifically, for example, every time a dictionary-compressed symbol is received (read, or fetched) from the dictionary-based compression unit 21, the EOB symbol addition unit 221 acquires the size of data on which the dictionary-based compression to obtain the dictionary-compressed symbol was performed, and calculates the cumulative value of the acquired size (hereinafter, the cumulative value is referred to as an uncompressed data size). In a case where the dictionary-compressed symbol is a literal symbol, the size of data on which the dictionary-based compression to obtain the dictionary-compressed symbol was performed is, for example, 1 byte. In a case where the dictionary-compressed symbol is a match symbol, the size of data on which the dictionary-based compression to obtain the dictionary-compressed symbol was performed is, for example, a match length in bytes indicated by the match symbol. Hereinafter, the size of data on which the dictionary-based compression to obtain the dictionary-compressed symbol was performed is also referred to as a data size. The EOB symbol addition unit 221 sends the dictionary-compressed symbol for which the data size has been acquired, to the coding table generation unit 222 and the variable-length coding unit 223.

Based on the calculated uncompressed data size and block size information 41, the EOB symbol addition unit 221 determines whether or not the end of a dictionary-compressed symbol string 32 including the one or more dictionary-compressed symbols that were used for calculating the uncompressed data size corresponds to the end of a Huffman block. The block size information 41 indicates the size of one Huffman block (block size). For example, the block size information 41 is generated based on a block size defined in the information processing system 1. The block size information 41 may be stored in any storage area in the data compression device 15 (or the memory system 3) in advance, or may be received from the outside (for example, the host 2). The EOB symbol addition unit 221 determines whether or not the end of the dictionary-compressed symbol string 32 corresponds to the end of a Huffman block, depending on whether or not the calculated uncompressed data size has reached the block size. The symbol at the end (tail) of the dictionary-compressed symbols string 32 is a symbol for which the data size has been acquired immediately before (last).

When the calculated uncompressed data size has reached the block size (that is, when the end of the dictionary-compressed symbol string 32 corresponds to the end of a Huffman block), the EOB symbol addition unit 221 determines whether the all-literal determination information received from the all-literal determination unit 224 indicates "true" or "false".

When the all-literal determination information indicates "false", the EOB symbol addition unit 221 adds an EOB symbol to the end of the current Huffman block. That is, the EOB symbol addition unit 221 sends the EOB symbol to the coding table generation unit 222 and the variable-length coding unit 223. The sent EOB symbol is arranged after the dictionary-compressed symbol for which the data size has been acquired immediately before.

On the other hand, when the all-literal determination information indicates "true", the EOB symbol addition unit 221 does not add an EOB symbol to the end of the current Huffman block. That is, the EOB symbol addition unit 221 does not send an EOB symbol to the coding table generation unit 222 and the variable-length coding unit 223. Therefore, the EOB symbol is not arranged after the dictionary-compressed symbol for which the data size has been acquired immediately before.

Then, the EOB symbol addition unit 221 sends, to the all-literal determination unit 224, information (end-of-block flag) indicating that the end of the dictionary-compressed symbol string 32 that was used for calculating the uncompressed data size corresponds to the end of the Huffman block. The EOB symbol addition unit 221 may send the end-of-block flag to the coding table generation unit 222.

The coding table generation unit 222 generates a coding table 42 based on a frequency of occurrence of each of symbols that correspond to a Huffman block. The symbols corresponding to a Huffman block includes, for example, symbols received from the EOB symbol addition unit 221 from the first timing to the timing at which the end-of-block flag is received. Specifically, the coding table generation unit 222 assigns a short code word to a symbol having a high frequency of occurrence and assigns a long code word to a symbol having a low frequency of occurrence. The coding table generation unit 222 sends the generated coding table 42 to the variable-length coding unit 223. In addition, the coding table generation unit 222 outputs data indicative of the coding table 42 as a header portion 331 of the compressed stream 33.

The variable-length coding unit 223 generates, by variable-length coding, a plurality of variable-length codes that respectively correspond to a plurality of symbols corresponding to a Huffman block. Specifically, the variable-length coding unit 223 converts each of the plurality of symbols corresponding to the Huffman block into a variable-length code, based on the coding table 42. The variable-length coding unit 223 sequentially outputs the variable-length code converted from each of the symbols as a payload portion 332 of the compressed stream 33. In a case where the EOB symbol has been added by the EOB symbol addition unit 221, the payload portion 332 includes variable-length codes respectively corresponding to one or more dictionary-compressed symbols and a variable-length code at the tail corresponding to the EOB symbol. In a case where the EOB symbol has not been added by the EOB symbol addition unit 221, the payload portion 332 includes variable-length codes respectively corresponding to dictionary-compressed symbols that are literal symbols.

Note that, when having received a plurality of symbols that correspond to the next Huffman block from the EOB symbol addition unit 221, the coding table generation unit 222 generates a new coding table 42 and sends the new coding table to the variable-length coding unit 223. The variable-length coding unit 223 uses the new coding table 42 to convert each of the plurality of symbols that correspond to the Huffman block into a variable-length code.

Therefore, the compressed stream 33 includes, for each Huffman block, the header portion 331 including data indicative of the coding table 42, and the payload portion 332. The payload portion 332 includes either (A) a variable-length code string obtained by performing the variable-length coding on the dictionary-compressed symbol string 32 and the EOB symbol or (B) a variable-length code string obtained by performing the variable-length coding on the dictionary-compressed symbol string 32 whose all symbols are literal symbols.

Further, in a case where the payload portion 332 includes (B) a variable-length code string obtained by performing the variable-length coding on the dictionary-compressed symbol string 32 whose all symbols are literal symbols, the header portion 331 may further include information indicative of the size of the variable-length code string (hereinafter, referred to as compression size information). The size of the variable-length code string included in the payload portion 332 is the size of a variable-length code string that is obtained by performing the dictionary-based compression and the entropy coding on a corresponding Huffman block (that is, the size of a compressed Huffman block). In the data decompression device 16, for example, when one or more symbols have been obtained by performing the entropy decoding on one or more variable-length codes (variable-length code string) in the compressed stream 33, the compression size information is used to determine whether the end of the one or more variable-length codes corresponds to the end of a Huffman block. That is, the compression size information is used to determine a boundary between Huffman blocks.

Here, an example of a specific process by the all-literal determination unit 224 will be shown, and effects of changing whether or not the EOB symbol addition unit 221 adds an EOB symbol in accordance with the all-literal determination information will be described.

FIG. 10 is a flowchart illustrating an example of the procedure of an all-literal determination process executed in the data compression device 15 according to the embodiment. The all-literal determination process is a process of determining whether all one or more symbols in a dictionary-compressed symbol string 32 that correspond to a Huffman block are literal symbols or not. For example, in response to input of the uncompressed data 31 into the data compression device 15, the all-literal determination unit 224 executes the all-literal determination process. Here, an example in which a variable L is used in the all-literal determination process will be described. The variable L indicates whether or not all one or more dictionary-compressed symbols in a dictionary-compressed symbol string 32 that are received from the dictionary-based compression unit 21 by the all-literal determination unit 224 after the variable L is initialized, are literal symbols.

First, the all-literal determination unit 224 initializes the variable L (step S201). Specifically, the all-literal determination unit 224 sets the variable L to "true". The variable L is set to, for example, either "true" or "false". For example, "true" indicates that all the one or more dictionary-compressed symbols received from the dictionary-based compression unit 21 after the variable L is initialized are literal symbols. For example, "false" indicates that at least one of the one or more dictionary-compressed symbols received from the dictionary-based compression unit 21 after the variable L is initialized is not a literal symbol (that is, it is a match symbol). A signal including the variable L is output from the all-literal determination unit 224 to the EOB symbol addition unit 221 as the all-literal determination information.

The all-literal determination unit 224 receives a dictionary-compressed symbol from the dictionary-based compression unit 21 (step S202). Then, the all-literal determination unit 224 determines whether the variable L is "true" or not (step S203).

In a case where the variable L is "false" (No in step S203), the all-literal determination unit 224 proceeds to step S206.

In a case where the variable L is "true" (Yes in step S203), the all-literal determination unit 224 determines whether or not the received dictionary-compressed symbol is a literal symbol (step S204).

In a case where the received dictionary-compressed symbol is a literal symbol (Yes in step S204), the all-literal determination unit 224 proceeds to step S206.

In a case where the received dictionary-compressed symbol is not a literal symbol (No in step S204), the all-literal determination unit 224 sets the variable L to "false" (step S205) and proceeds to step S206.

Next, the all-literal determination unit 224 determines whether a signal indicative of the end of the current Huffman block (end-of-block flag) has been received from the EOB symbol addition unit 221 (step S206).

When a signal indicative of the end of the current Huffman block has not been received from the EOB symbol addition unit 221 (No in step S206), the all-literal determination unit 224 returns to step S202. That is, the all-literal determination unit 224 further performs a process of receiving a dictionary-compressed symbol from the dictionary-based compression unit 21, and determining whether or not the received dictionary-compressed symbol is a literal symbol while the variable L is "true".

When the signal indicative of the end of the current Huffman block has been received from the EOB symbol addition unit 221 (Yes in step S206), the all-literal determination unit 224 returns to step S201. That is, the all-literal determination unit 224 further performs a process of initializing the variable L and determining whether or not all symbols obtained by the dictionary-based compression on the next Huffman block are literal symbols.

With the all-literal determination process described above, the all-literal determination unit 224 can output, to the EOB symbol addition unit 221, the signal indicating whether or not all symbols obtained by the dictionary-based compression on a Huffman block are literal symbols (all-literal determination information), by using the variable L.

Specifically, in a case where all the one or more dictionary-compressed symbols obtained by the dictionary-based compression on the Huffman block are literal symbols (that is, in a case where the variable L is "true"), the EOB symbol addition unit 221 does not add an EOB symbol to the tail of the dictionary-compressed symbols. Accordingly, since the number of symbols on which the entropy coding is performed is reduced, the data compression device 15 can improve the compression efficiency and the coding throughput.

On the other hand, in a case where at least one of the one or more dictionary-compressed symbols obtained by the dictionary-based compression on the Huffman block is not a literal symbol (that is, in a case where the variable L is "false"), the EOB symbol addition unit 221 adds an EOB symbol to the tail of the dictionary-compressed symbols. In this case, for example, since the boundary between the Huffman block and the next Huffman block can be detected by using the EOB symbol, it is not necessary to calculate the uncompressed data size DS depending on the type of a dictionary-compressed symbol obtained by the variable-length decoding as in the data decompression device 16C-2 of the second comparative example. Therefore, it is possible to avoid a decrease in the decoding throughput in the data decompression device 16.

With the above-described configuration, the data compression device 15 can compress the uncompressed data 31 into the compressed stream 33 by the dictionary-based compression and the entropy coding. In a case where all one or more dictionary-compressed symbols in a dictionary-compressed symbol string 32 obtained by performing the dictionary-based compression on a Huffman block are literal symbols, the data compression device 15 can improve the compression efficiency and the coding throughput by not adding an EOB symbol. In addition, in a case where at least one of the one or more dictionary-compressed symbols in a dictionary-compressed symbol string 32 obtained by the dictionary-based compression on the Huffman block is not a literal symbol, the data compression device 15 may avoid a decrease in the throughput at the time of decoding by adding an EOB symbol.

(Data Decompression Device 16)

FIG. 11 is a block diagram illustrating an example of a configuration of the data decompression device according to the embodiment. The data decompression device 16 is a decompressor that decompresses a compressed stream 33 into uncompressed data 31 by the entropy decoding and the dictionary-based decompression. The compressed stream 33 is data to be decompressed corresponding to one or more Huffman blocks. The data decompression device 16 includes an entropy decoding unit 51 and a dictionary-based decompression unit 52.

The entropy decoding unit 51 generates a dictionary-compressed symbol string 32 from the compressed stream 33 by the entropy decoding. The entropy decoding unit 51 includes, for example, a header/payload separation unit 511, a coding table restoration unit 512, a variable-length decoding unit 513, an EOB symbol detection unit 514, a block boundary determination unit 515, an all-literal determination unit 516, and a multiplexer (MUX) 517.

The dictionary-based decompression unit 52, the header/payload separation unit 511, the coding table restoration unit 512, the variable-length decoding unit 513, the EOB symbol detection unit 514, the block boundary determination unit 515, the all-literal determination unit 516, and the MUX 517 are implemented by at least one of a register, an adder, a multiplier, a selector, and other arithmetic units. The register is, for example, implemented by a logical circuit such as a flip-flop. The adder, the multiplier, the selector, and the other arithmetic units are implemented by, for example, a logical circuit.

The header/payload separation unit 511 separates a header portion 331 and a payload portion 332 included in the compressed stream 33. The header/payload separation unit 511 sends the header portion 331 to the coding table restoration unit 512. The header/payload separation unit 511 sends the payload portion 332 subsequent to the header portion 331 to the variable-length decoding unit 513. Note that in a case where the header portion 331 includes all-literal determination information, the header/payload separation unit 511 may send the all-literal determination information to the all-literal determination unit 516.

The coding table restoration unit 512 restores a coding table 42 by using data included in the header portion 331. The coding table restoration unit 512 sends the restored coding table 42 to the variable-length decoding unit 513.

The variable-length decoding unit 513 generates a plurality of symbols that respectively correspond to a plurality of variable-length codes included in the payload portion 332, by the variable-length decoding. Specifically, the variable-length decoding unit 513 converts each of the plurality of variable-length codes included in the payload portion 332 into a symbol, based on the coding table 42. The symbol obtained by the conversion is either a dictionary-compressed symbol or the EOB symbol. The variable-length decoding unit 513 sequentially sends the generated symbols to each of the EOB symbol detection unit 514, the block boundary determination unit 515, the all-literal determination unit 516, and the dictionary-based decompression unit 52.

The EOB symbol detection unit 514 detects the EOB symbol from the symbols received from the variable-length decoding unit 513, and sends information indicating that the EOB symbol has been detected to the MUX 517 and the block boundary determination unit 515. The information indicating that the EOB symbol has been detected is also referred to as an EOB detection flag.

Specifically, every time the EOB symbol detection unit 514 receives a symbol from the variable-length decoding unit 513, the EOB symbol detection unit 514 determines whether the symbol matches the EOB symbol or not. For example, in a case where one or more symbols are received from the variable-length decoding unit 513, the EOB symbol detection unit 514 determines whether the one or more symbols each match the EOB symbol (more specifically, the value assigned to the EOB symbol) or not in order from the head of the one or more symbols. Then, the EOB symbol detection unit 514 sends the EOB detection flag (that is, information indicating that the end of the one or more symbols corresponds to the end of a Huffman block) to the MUX 517 and the block boundary determination unit 515.

The block boundary determination unit 515 sends, to the MUX 517, information indicating that the end of one or more symbols received from the variable-length decoding unit 513 contiguously after a second timing corresponds to the end of a Huffman block (block boundary flag). The second timing is a timing at which a data decompression process in the data decompression device 16 is started, or a timing at which the EOB detection flag is received from the EOB symbol detection unit 514.

Specifically, every time the block boundary determination unit 515 receives a symbol from the variable-length decoding unit 513, the block boundary determination unit 515 acquires the size of data to be obtained by performing the dictionary-based decompression on the symbol, and calculates the cumulative value of the acquired size (hereinafter, the cumulative value is referred to as an uncompressed data size). The block boundary determination unit 515 assumes that the received symbol is a literal symbol and acquires the size of data to be obtained by performing the dictionary-based decompression on the symbol. Since the literal symbol is a symbol not being dictionary-compressed, the size of data to be obtained by performing the dictionary-based decompression on the literal symbol is, for example, 1 byte. Therefore, by the assumption that each of symbols received from the variable-length decoding unit 513 is a literal symbol, the block boundary determination unit 515 can easily calculate the uncompressed data size by counting the number of the received symbols. Hereinafter, the size of data to be obtained by performing the dictionary-based decompression on a symbol (dictionary-compressed symbol) is also referred to as a data size.

The block boundary determination unit 515 determines whether or not the end of one or more symbols used for calculating the uncompressed data size corresponds to the end of a Huffman block, based on the calculated uncompressed data size and the block size information 41. The block size information 41 may be stored in any storage area in the data decompression device 16 (or the memory system 3) in advance, or may be received from the outside (for example, the host 2). Specifically, when the calculated uncompressed data size has reached the block size, the block boundary determination unit 515 determines that the end of the one or more symbols corresponds to the end of a Huffman block. The latest symbol for which the data size has been calculated corresponds to the end of the Huffman block. Accordingly, the block boundary determination unit 515 can detect a boundary between the Huffman block and the next Huffman block. In response to detecting the boundary between the Huffman blocks, the block boundary determination unit 515 sends the block boundary flag to the MUX 517. The block boundary flag is, for example, a signal indicating that the boundary between Huffman blocks has been detected (that is, the end of one or more symbols corresponds to the end of a Huffman block). An example of a specific process by the block boundary determination unit 515 will be described later with reference to a flowchart of FIG. 12.

The all-literal determination unit 516 sends information (all-literal determination information) indicating whether or not all one or more symbols received from the variable-length decoding unit 513 contiguously after a third timing are literal symbols, to the MUX 517 and the block boundary determination unit 515. Hereinafter, the one or more symbols received from the variable-length decoding unit 513 contiguously after the third timing is also referred to as a target symbol string. The third timing is a timing at which a data decompression process in the data decompression device 16 is started, or a timing at which the MUX 517 notifies the end of a Huffman block. For example, the all-literal determination unit 516 determines whether or not all symbols in the target symbol string are literal symbols, based on whether or not a byte value of each symbol included in the target symbol string matches a predetermined byte value of any of literal symbols (for example, a byte value of any of literal symbols defined in DEFLATE).

Note that the all-literal determination unit 516 may use the all-literal determination information received from the header/payload separation unit 511 (that is, the all-literal determination information in the header portion 331) to determine whether or not all symbols in the target symbol string are literal symbols. In this case, the circuit scale (operation amount) of the all-literal determination unit 516 can be reduced.

The all-literal determination unit 516 sends the all-literal determination information to the MUX 517 and the block boundary determination unit 515, for example, at all times or at regular intervals. An all-literal determination process by the all-literal determination unit 516 is substantially similar to the all-literal determination process by the all-literal determination unit 224 of the data compression device 15. More specifically, the all-literal determination process by the all-literal determination unit 516 corresponds to a process in which the dictionary-based compression unit 21 and the EOB symbol addition unit 221 in the all-literal determination process described above with reference to the flowchart of FIG. 10 are respectively replaced with the variable-length decoding unit 513 that sends a symbol to the all-literal determination unit 516 and the MUX 517 that notifies the all-literal determination unit 516 of the end of a Huffman block.

The MUX 517 is a selector that outputs either the EOB detection flag output by the EOB symbol detection unit 514 or the block boundary flag output by the block boundary determination unit 515, depending on whether the all-literal determination information is "true" or "false". Note that in an example of the MUX 517 illustrated in FIG. 11, the all-literal determination information of "true" is represented as "1", and the all-literal determination information of "false" is represented as "0". Specifically, when the EOB detection flag has been received from the EOB symbol detection unit 514 while the all-literal determination information indicative of "false" ("0" in FIG. 11) is received from the all-literal determination unit 516, the MUX 517 notifies the coding table restoration unit 512 of changing the coding table 42 on the basis of the EOB detection flag and notifies the all-literal determination unit 516 of the end of the current Huffman block. On the other hand, when the block boundary flag has been received from the block boundary determination unit 515 while the all-literal determination information indicative of "true" ("1" in FIG. 11) is received from the all-literal determination unit 516, the MUX 517 notifies the coding table restoration unit 512 of changing the coding table 42 on the basis of the block boundary flag and notifies the all-literal determination unit 516 of the end of the current Huffman block. Specifically, in order to notify the changing the coding table 42, the MUX 517 sends, for example, a signal indicative of the changing the coding table 42 to the coding table restoration unit 512. In order to notify the end of the current Huffman block, the MUX 517 sends, for example, a signal indicative of the end of the current Huffman block to the all-literal determination unit 516.

In response to being notified of the changing the coding table 42 by the MUX 517, the coding table restoration unit 512 restores a new coding table 42 by using data included in the next header portion received from the header/payload separation unit 511. By using the new coding table 42, the variable-length decoding unit 513 converts each of a plurality of variable-length codes included in the subsequent payload portion into a symbol.

The dictionary-based decompression unit 52 generates the uncompressed data 31 from a dictionary-compressed symbol received from the variable-length decoding unit 513, by the dictionary-based decompression. Specifically, in a case where the dictionary-compressed symbol is a match symbol, the dictionary-based decompression unit 52 outputs a past byte string in the history buffer indicated by a pointer indicated in the match symbol, as the uncompressed data 31. In a case where the dictionary-compressed symbol is a literal symbol, the dictionary-based decompression unit 52 outputs the literal symbol as it is, as the uncompressed data 31. Further, the dictionary-based decompression unit 52 does not output any EOB symbol received from the variable-length decoding unit 513, as the uncompressed data 31.

Here, an example of a specific process by the block boundary determination unit 515 will be shown, and effects of the MUX 517 selecting either the EOB detection flag or the block boundary flag in accordance with the all-literal determination information and notifying the coding table restoration unit 512 of changing the coding table 42 will be described.

FIG. 12 is a flowchart illustrating an example of the procedure of a block boundary determination process executed in the data decompression device 16 according to the embodiment. The block boundary determination process is a process of determining the boundary between Huffman blocks in a case where all symbols (more specifically, symbols obtained by the variable-length decoding) that correspond to the current Huffman block are literal symbols. For example, in response to inputting the compressed stream 33 to the data decompression device 16, the block boundary determination unit 515 executes the block boundary determination process.

First, the block boundary determination unit 515 initializes a counter C (step S301). Specifically, the block boundary determination unit 515 sets the counter C to zero. The counter C is a variable indicative of the number of symbols that have been received from the variable-length decoding unit 513 by the block boundary determination unit 515 after the counter C is initialized. That is, the counter C indicates the uncompressed data size in a case where each symbol received from the variable-length decoding unit 513 is assumed to be a literal symbol (that is, a 1-byte symbol).

The block boundary determination unit 515 receives a symbol from the variable-length decoding unit 513 (step S302). Then, the block boundary determination unit 515 determines whether or not an EOB symbol has been detected by the EOB symbol detection unit 514 after initializing the counter C (step S303). Specifically, for example, the block boundary determination unit 515 determines whether or not the EOB detection flag has been received from the EOB symbol detection unit 514 after initializing the counter C.

When an EOB symbol has been detected by the EOB symbol detection unit 514 (Yes in step S303), the block boundary determination unit 515 returns to step S301. That is, since the end of the current Huffman block has already been detected by the detection of the EOB symbol, the block boundary determination unit 515 further performs a process for determining the end of the next Huffman block.

When the EOB symbol is not detected by the EOB symbol detection unit 514 (No in step S303), the block boundary determination unit 515 adds one to the counter C (step S304). The block boundary determination unit 515 determines whether or not all symbols received after initializing the counter C (that is, dictionary-compressed symbols that correspond to the current Huffman block) are literal symbols (step S305). Specifically, for example, the block boundary determination unit 515 determines whether or not all the symbols received after initializing the counter C are literal symbols, based on the all-literal determination information received from the all-literal determination unit 516.

When at least one of the symbols received after initializing the counter C is not a literal symbol (No in step S305), the block boundary determination unit 515 returns to step S302. In this case, the block boundary determination unit 515 cannot use the counter C to detect the boundary of the current Huffman block and the next Huffman block. That is, the block boundary determination unit 515 cannot perform detection of the boundary of the Huffman blocks based on the uncompressed data size in a case where all the received symbols are assumed to be literal symbols. Therefore, the block boundary determination unit 515 returns to step S301 in order to detect the next boundary of Huffman blocks in response to detection of an EOB symbol by the EOB symbol detection unit 514 in step S303.

When all the symbols received after initializing the counter C are literal symbols (Yes in step S305), the block boundary determination unit 515 determines whether or not the counter C is equal to the block size (step S306).

When the counter C is equal to the block size (Yes in step S306), the block boundary determination unit 515 determines that the boundary of the current Huffman block has been detected, outputs the block boundary flag (step S307), and returns to step S301. That is, the block boundary determination unit 515 further performs a process of detecting the next block boundary of Huffman blocks. The block boundary flag is output to the coding table restoration unit 512 through the MUX 517. Accordingly, the coding table restoration unit 512 is instructed to change the coding table 42.

In response to receiving the block boundary flag, the coding table restoration unit 512 acquires the next header portion in the compressed stream 33. The coding table restoration unit 512 restores a new coding table 42 by using the acquired header portion and changes the previous coding table 42 to the new coding table 42. Accordingly, the variable-length decoding unit 513 decodes the subsequent symbols (payload portion) in the compressed stream 33 by using the new coding table 42.

According to the above-described block boundary determination process, in a case where all symbols (dictionary-compressed symbols) that are obtained by the variable-length decoding and correspond to a Huffman block are literal symbols, the data decompression device 16 can detect the end of the Huffman block, based on the number of the symbols obtained from the variable-length decoding unit 513. In this case, the data decompression device 16 needs neither the processing cycle of decoding the code of the EOB symbol in the data decompression device 16C-1 of the first comparative example nor the calculation of the uncompressed data size DS depending on the type of a symbol obtained by the variable-length decoding in the data decompression device 16C-2 of the second comparative example. Therefore, the data decompression device 16 can improve the decoding throughput. In addition, since any EOB symbol is not added to the Huffman block corresponding to dictionary-compressed symbols that are literal symbols, the input compressed stream 33 is data having high compression efficiency.

Note that the block boundary determination unit 515 may use the compression size information to determine whether or not the end of one or more symbols contiguously received from the variable-length decoding unit 513 after the second timing corresponds to the end of a Huffman block. The compression size information is information indicative of the size of a data block (more specifically, a variable-length code string) obtained by performing the dictionary-based compression and the entropy coding on a corresponding Huffman block. The compression size information is acquired from the header portion 331, for example. Note that the compression size information indicative of a specific size may be stored in the data decompression device 16 in advance.

Specifically, the block boundary determination unit 515 calculates the data size of one or more variable-length codes corresponding to one or more symbols received from the variable-length decoding unit 513 (hereinafter, the data size of one or more variable-length codes is referred to as a compressed data size). For example, every time a symbol is received from the variable-length decoding unit 513, the block boundary determination unit 515 acquires the size of data on which the variable-length decoding to obtain the symbol was performed (for example, a code length of a corresponding variable-length code) by using the coding table 42, and calculates the cumulative value of the acquired size as the compressed data size. Then, for example, in a case where all the received one or more symbols are literal symbols, the block boundary determination unit 515 sends, to the MUX 517, information (block boundary flag) indicating that the end of the one or more symbols used for calculating the compressed data size corresponds to the end of a Huffman block, based on the calculated compressed data size and the compression size information. More specifically, when the all-literal determination information received from the all-literal determination unit 516 indicates "true" and the calculated compressed data size is equal to a size indicated in the compression size information, the block boundary determination unit 515 sends the block boundary flag to the MUX 517. Even in a case where the compression size information is used for determining the boundary between Huffman blocks, it is possible to obtain effects similar to that in the block boundary determination process described above with reference to FIG. 12.

With the above-described configuration, the data decompression device 16 can decompress the compressed stream 33 into the uncompressed data 31 by the entropy decoding and the dictionary-based decompression. In a case where all one or more symbols obtained by performing the entropy decoding on the compressed stream 33 are literal symbols, the data decompression device 16 can determine the boundary between Huffman blocks by counting the number of those symbols and thus improve the decoding throughput. In addition, in a case where at least one of the one or more symbols obtained by performing the entropy decoding on the compressed stream 33 is not a literal symbol, the data decompression device 16 can determine the boundary between the Huffman blocks by detecting an EOB symbol and thus avoid a decrease in the decoding throughput.

As described above, the data compression device 15 generates the compressed stream 33 in which the uncompressed data 31 is compressed. For example, in a case where the uncompressed data 31 is data requested to be written into the NAND flash memory 4 by the host 2, the CPU 11 writes the compressed stream 33 into the NAND flash memory 4 via the NAND I/F 12.

In addition, the controller 6 may further include an ECC encoder and an ECC decoder. In this case, the ECC encoder generates a parity for error correction (ECC parity) for the compressed data (compressed stream) 33 output from the data compression device 15 and generates a code word having the generated ECC parity and the compressed data 33. The CPU 11 is configured to write the code word into the NAND flash memory 4 via the NAND I/F 12. In other words, the CPU 11 is configured to write data based on the compressed data 33, which is output from the data compression device 15, into the NAND flash memory 4 via the NAND I/F 12. In addition, for example, when a read command has been received from the host 2 via the host I/F 14, the CPU 11 reads data based on the read command from the NAND flash memory 4 via the NAND I/F 12. The ECC decoder executes an error correction process on the read data. The read data on which the error correction process has been executed is input to the data decompression device 16 by the CPU 11 as the compressed data 33, and the data decompression device 16 decompresses the input compressed data 33, thereby generating the uncompressed data 31. The CPU 11 transmits the uncompressed data 31 to the host 2 as a response to the read command from the host 2. That is, in response to the read command from the host 2, the CPU 11 is configured to decompress the compressed data 33 based on the data read from the NAND flash memory 4 and transmit the uncompressed data 31 to the host 2.

Further, part or all of the data compression device 15 and the data decompression device 16 may be implemented as hardware such as circuitry, or may be implemented as programs (that is, software) being executed by at least one processor.

As described above, according to the data compression device 15 and the data decompression device 16 of the present embodiment, the throughput can be improved.

In the data compression device 15, in a case where the dictionary-based compression on a first data block (Huffman block) is performed, the all-literal determination unit 224 determines whether all one or more symbols included in a second data block are literal symbols or not. The one or more symbols are obtained by performing the dictionary-based compression on the first data block. In a case where all the one or more symbols are literal symbols, the EOB symbol addition unit 221 does not add an end-of-block symbol to the end of the second data block. In a case where at least one symbol among the one or more symbols is not a literal symbol, the EOB symbol addition unit 221 adds an end-of-block symbol to the end of the second data block.

As described above, in a case where all the one or more symbols obtained by performing the dictionary-based compression on the Huffman block are literal symbols, the EOB symbol addition unit 221 does not add an EOB symbol to the end of the one or more symbols. Accordingly, since the number of symbols on which the entropy coding is performed is reduced, the data compression device 15 can improve the encoding throughput and the compression efficiency.

In addition, in the data decompression device 16, the all-literal determination unit 516 determines whether all one or more symbols obtained by performing the entropy decoding on the compressed data 33 are literal symbols or not. The block boundary determination unit 515 calculates a first data size of data to be obtained by performing the dictionary-based decompression on the one or more symbols. In a case where all the one or more symbols are literal symbols, the block boundary determination unit 515 outputs information indicating that a symbol of one or more symbols corresponds to the end of a data block, based on the first data size and the block size information 41 indicative of the size of an uncompressed data block (i.e., Huffman block). In a case where at least one symbol among the one or more symbols is not a literal symbol, the EOB symbol detection unit 514 outputs information indicating that a symbol of the one or more symbols corresponds to the end of the data block, based on the value of the symbol of the one or more symbols.

As described above, in a case where all the one or more symbols are literal symbols, the block boundary determination unit 515 can detect the end of the Huffman block without detecting an EOB symbol. In addition, in a case where at least one symbol among the one or more symbols is not a literal symbol, the EOB symbol detection unit 514 can determine the end of the Huffman block by detecting an EOB symbol. Accordingly, the data decompression device 16 can improve the decoding throughput.

Each of the various functions described in the embodiment may be realized by a circuit (e.g., processing circuit). An exemplary processing circuit may be a programmed processor such as a central processing unit (CPU). The processor executes computer programs (instructions) stored in a memory thereby performs the described functions. The processor may be a microprocessor including an electric circuit. An exemplary processing circuit may be a digital signal processor (DSP), an application specific integrated circuit (ASIC), a microcontroller, a controller, or other electric circuit components. The components other than the CPU described according to the embodiment may be realized in a processing circuit.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A data decompression device comprising:
   all-literal determination circuitry configured to determine whether or not all one or more symbols that are obtained by performing entropy decoding on compressed data are literal symbols;
   block boundary determination circuitry configured to:
   calculate a first data size of data to be obtained by performing dictionary-based decompression on the one or more symbols; and
   in a case where all the one or more symbols are literal symbols, output a first information indicating that a symbol of the one or more symbols corresponds to an end of a data block, based on the first data size and information indicative of a size of an uncompressed data block; and
   end-of-block symbol detection circuitry configured to, in a case where at least one symbol among the one or more symbols is not a literal symbol, output a second information indicating that a symbol of the one or more symbols corresponds to the end of the data block, based on the symbol of the one or more symbols.

2. The data decompression device according to claim 1, wherein the compressed data includes a third information indicating whether all the one or more symbols are literal symbols or not, and the all-literal determination circuitry is configured to determine whether all the one or more symbols are literal symbols or not, based on the third information.

3. The data decompression device according to claim 1, wherein the block boundary determination circuitry is configured to calculate the first data size based on a number of the one or more symbols.

4. The data decompression device according to claim 3, wherein the block boundary determination circuitry is configured to output the first information in a case where the first data size is equal to the size of the uncompressed data block.

5. The data decompression device according to claim 1, wherein the end-of-block symbol detection circuitry is configured to:

determine whether a symbol of the one or more symbols is an end-of-block symbol or not; and in a case where the symbol of the one or more symbols is the end-of-block symbol, output the second information.

6. The data decompression device according to claim 5, wherein the end-of-block symbol detection circuitry is configured to, in a case where a symbol of one or more symbols is the end-of-block symbol, output the second information to the block boundary determination circuitry.

7. The data decompression device according to claim 1, further comprising:

decoding circuitry configured to:

generate the one or more symbols by performing the entropy decoding on the compressed data by using a first coding table obtained from the compressed data; and in a case where the first information is output or in a case where the second information is output, generate one or more subsequent symbols to the one or more symbols by performing the entropy decoding on the compressed data by using a second coding table that is different from the first coding table and is obtained from the compressed data.

8. The data decompression device according to claim 1, further comprising decoding circuitry configured to generate the one or more symbols by performing the entropy decoding on one or more variable-length codes included in the compressed data, wherein the block boundary determination circuitry is configured to:

calculate a second data size of the one or more variable-length codes; and in a case where all the one or more symbols are literal symbols, output the first information, based on the second data size and a third information that indicates a size of a second data block obtained by performing dictionary-based compression and entropy coding on a first data block.

9. The data decompression device according to claim 8, wherein the block boundary determination circuitry is configured to output the first information in a case where the second data size is equal to the size of the second data block.

10. The data decompression device according to claim 8, wherein the compressed data includes the third information.

11. A memory system comprising:

a nonvolatile memory; and controller circuitry including the data decompression device according to claim 1 and configured to read the compressed data from the nonvolatile memory.

* * * * *